(12) United States Patent
Ritter et al.

(10) Patent No.: US 6,363,169 B1
(45) Date of Patent: Mar. 26, 2002

(54) APPARATUS AND METHOD OF THREE-DIMENSIONAL MODELING

(75) Inventors: Dieter Ritter, Nürnberg; Yukinori Matsumoto; Kazuhide Sugimoto, both of Tsukuba; Tsutomu Arakawa, Ryugasaki, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/120,468

(22) Filed: Jul. 23, 1998

(30) Foreign Application Priority Data

Jul. 23, 1997 (JP) .............................................. 9-197376
Jul. 7, 1998 (JP) .......................................... 10-191868

(51) Int. Cl.[7] ............................ G06K 9/28; G06K 9/36; G06K 9/46; G06K 9/74; G06T 17/00

(52) U.S. Cl. ..................................................... 382/154

(58) Field of Search ................................ 382/103, 154, 382/106, 151, 203, 204, 291; 356/3.16, 12, 602, 610, 611, 617, 623, 421–423; 250/559.29, 559.31; 345/419; 702/40, 95, 94, 152, 153; 348/42, 50, 116, 137, 142; 359/470; 901/47

(56) References Cited

U.S. PATENT DOCUMENTS

| | | | |
|---|---|---|---|
| 4,982,438 A | | 1/1991 | Usami et al. .................. 382/25 |
| 5,525,883 A | * | 6/1996 | Avitzour ...................... 318/587 |
| 5,642,293 A | * | 6/1997 | Manthey et al. ............. 364/508 |
| 5,856,844 A | * | 1/1999 | Batterman et al. .......... 348/207 |
| 6,028,955 A | * | 2/2000 | Cohen et al. ................ 382/154 |
| 6,031,941 A | * | 2/2000 | Yano et al. .................. 382/276 |

FOREIGN PATENT DOCUMENTS

JP   5-135155   6/1993

OTHER PUBLICATIONS

Transactions of Institute of Electronics, Information and Communication Engineers of Japan, 79/1, vol.J62–D, No. 1, pp. 1–8, Jul. 1979.
International Conference on Computer Vision, pp. 136–144, 1987.
Transactions of Institute of Electronics, Information and Communication Engineers of Japan, D–II, vol.J76–D–II, No. 6, pp. 1114–1122, Jun. 1993.
Information Processing Society of Japan Computer Vision Research Material, pp. 1–6, Jul. 18, 1985.
International Conference on Recent Advances in 3–D Digital Imaging and Modeling, pp. 173–180, May 1997.
SPIE, vol. 2182 Image and Video Processing II (1994), pp. 388–397, 1994.
CVGIP: Image Understanding, vol. 58, No. 1, pp. 23–32, Jul. 1993.
IEEE Transactions on Pattern Analysis and Machine Intelligence, vol. PAMI–5, No. 2, pp. 150–158, Mar. 1983.
Omnidirectional Image Synthesize—article from Nikkei Sangyo Shinbun, Nov. 23, 1996.

(List continued on next page.)

Primary Examiner—Leo Boudreau
Assistant Examiner—Brian P. Werner
(74) Attorney, Agent, or Firm—Armstrong, Westerman & Hattori, LLP

(57) ABSTRACT

A reference sheet is employed on which reference points are arranged irregularly and asymmetrically. An object of interest is placed on the reference sheet. The object of interest is shot together with the reference points by a camera. A shooting position of the camera is calculated according to the Hough transform method on the basis of the position of a reference point in the obtained object image. A three-dimensional model is generated according to the obtained object image and shooting position. Therefore, a simple and economic three-dimensional modeling apparatus that does not require a turntable can be provided.

19 Claims, 30 Drawing Sheets

OTHER PUBLICATIONS

53th National Conference of Information Processing Society of Japan, pp2–5, 2–285–2–286, Sep. 5, 1996.

International Conference on Recent Advances in 3D Digital Imaging and Modeling, pp. 197–204, May 1997.

Three Dimensional Image—article from Nikkei Keizai Shinbun, Oct. 5, 1996.

Transaction Institute of Electronics, Information and Communication Engineers of Japan, D–II, vol.J76–D–II, No. 8, pp. 1497–1505, Aug. 1993.

Computer Vision, Graphics, and Image Processing 44, 87–116, 1988.

Numerical Recipe in C. Kijitsu Hyorosha, pp. 540–547.

Three Dimensional Scanner Using Monocular Camera Yukinori Matsumoto et al. pp. 1–8.

* cited by examiner

IMAGE SHOOTING

SILHOUETTE FORMATION

VOTING PROCESS

POLYGON FORMATION

CAPTURE TEXTURE

22

APPARATUS AND METHOD OF THREE-DIMENSIONAL MODELING

BACKGROUND OF THE INVENTION

1. Field of the Invention

The present invention relates to an apparatus and method of three-dimensional modeling, and a medium on which a three-dimensional modeling program is recorded. More particularly, the present invention relates to an apparatus and method of three-dimensional modeling for generating a three-dimensional model of an object of interest, and a medium on which a three-dimensional modeling program is recorded.

2. Description of the Background Art

Recently, various three-dimensional scanners that input the shape and texture (color and pattern) of a three-dimensional object of interest are developed for the purpose of obtaining a three-dimensional graphic image.

For example, Japanese Patent Laying-Open No. 5-135155 discloses a three-dimensional modeling apparatus that generates a three-dimensional model of an object of interest by shooting the object of interest mounted on a turntable with a monocular camera to obtain a plurality of silhouette images. According to this apparatus, a plurality of cross sectional shapes of the object of interest in a plurality of horizontal planes (plane perpendicular to the axis of rotation of the turntable) on the basis of the obtained plurality of silhouette images. Then, the points on the contour line of the shape of the object of interest in adjacent horizontal planes are joined together to form a triangular patch, from which a three-dimensional model of the object is produced. In such a three-dimensional modeling apparatus, the camera position can be fixed since the object of interest is rotated on a turntable. It is therefore not necessary to calculate the camera position.

However, such a turntable is extremely costly, which has become the bottleneck in realizing a simple and economic three-dimensional modeling apparatus.

A method of calculating the camera position from an object image obtained by shooting an object of interest using the commonly called factorization method is disclosed by Takeo Kanade, Conrad J. Poelman, and Toshihiko Morita in "A Factorization Method for Shape and Motion Recovery" Transaction of Institute of Electronics, Information and Communication Engineers of Japan, D-II, Vol. J76-D-II, No. 8, pp. 1497–1505, August 1993. However, this method is inadequate to generate a full model of an object of interest since there was a problem that a calculation error is sequentially accumulated.

SUMMARY OF THE INVENTION

In view of the foregoing, an object of the present invention is to provide a simple and economic apparatus and method of three-dimensional modeling that does not require a turntable, and a medium on which a three-dimensional modeling program is recorded.

According to an aspect of the present invention, a three-dimensional modeling apparatus generates a three-dimensional model of an object of interest, and includes a plurality of reference subjects (objects), an image capture device, a calculation device, and a generator. The plurality of reference subjects are arranged at predetermined positions. The image capture device, a camera for example, picks up the image of the object of interest together with the reference subject to obtain an object image. The calculation device refers to the reference subject in the object image to calculate the shooting position of the image capture device. The generator generates a three-dimensional model according to the object image and the shooting position.

Preferably, the reference subjects are arranged irregularly and asymmetrically. Preferably, the reference subjects are arranged in a scattered manner. More specifically, when the distance from one certain reference subject to another reference subject is l, and the angle between two direction vectors from that certain reference subject to two other reference subjects is θ, it is desired that the arrangement of the reference subjects is determined so that the distribution of the number of reference subjects at distance l and the distribution of the number of reference subjects with angle θ are uniform. Reference subjects arranged regularly can be provided in addition to reference subjects arranged irregularly.

Preferably, the plurality of reference subjects have a plurality of attributes. When the reference subject has an attribute, it is desirable to determine the arrangement of the reference subjects so that the distribution of the number of reference subjects at distance l and the distribution of the number of reference subjects with angle θ are uniform for each attribute.

Preferably, the attribute is a color. When the plurality of reference subjects have a plurality of color attributes and the hue of 360 degrees at a predetermined color space is divided into that plurality of colors, the plurality of colors are preferably selected so that the angle between two adjacent colors in the divided hue is as large as possible.

Preferably, the reference subjects are formed on a 2-D plane e.g. a reference sheet. However, the reference subject can be formed on a plane of a plate thicker than the reference sheet, a platform, or the floor.

The reference subjects are formed at a reference object having a stereoscopic structure. Here, an object having a stereoscopic structure covered with the reference sheet can be used as a reference object.

Preferably, the calculation device calculates the shooting position according to the Hough transform method.

Preferably, the shooting position calculation device includes an extractor, a selector, an allocation device, a candidate calculation device, an evaluation device, and a determination device. The extractor extracts a shot reference subject from the object image. The selector selects a plurality of reference subjects from the extracted reference subject. The allocation device establishes correspondence between each of the selected reference subjects and any one of the arranged plurality of reference subjects (the position data of which are stored to the allocation device) to allocate the position of a corresponding reference subject as the position candidate. The candidate calculation device calculates the shooting position candidate of the capture device according to the position candidate of the reference subject. The evaluation device applies an evaluation value (evaluation based on probability, for example points) to the shooting position candidate. The determination device determines the shooting position candidate having the greatest evaluation value out of the calculated plurality of shooting position candidates as the shooting position for the image capture device.

Preferably, the plurality of reference subjects have a plurality of attributes. The shooting position calculation device includes an extractor, a selector, an allocation device, a candidate calculation device, an evaluation device, and a determination device. The extractor extracts a shot reference subject from the object image. The selector selects a plurality of reference subjects from the extracted reference subject. The allocation device establishes correspondence between each of the selected reference subjects and any one of the arranged plurality of reference subjects (the position data of which are stored to the allocation device) having the same attribute to allocate the position of a corresponding reference subject as the position candidate. The candidate calculation device calculates the shooting position candidate of the image capture device according to the position candidates of the reference subject. The evaluation device applies an evaluation value (evaluation based on probability, for example points) to the shooting position candidate. The determination device determines the shooting position candidate having the greatest evaluation value out of the calculated plurality of shooting position candidates as the shooting position for the image capture device.

Preferably, the reference subject is formed at a reference object having a stereoscopic structure. The shooting position calculation device includes an extractor, a selector, an allocation device, a candidate calculation device, a judge device, an evaluation device, and a determination device. The extractor extracts a shot reference subject from the object image. The selector selects a plurality of reference subjects from the extracted reference subjects. The allocation device establishes correspondence between each of the selected reference subjects and any one of the arranged plurality of reference subjects (the position data of which are stored to the allocation device) to allocate the position of the corresponding reference subject as the position candidate. The candidate calculation device calculates the shooting position candidate of the image capture device according to the position candidate of the reference subject. The judge device judges whether the image capture device can shoot the allocated reference subject from the shooting position candidate. The evaluation device applies an evaluation value (evaluation based on probability, for example points) to the shooting position candidate when judgement is made that the allocated reference subject can be shot. The determination device determines the shooting position candidate having the greatest evaluation value out of the calculated plurality of shooting position candidates as the shooting position for the image capture device.

Preferably, the judge device includes an inner product calculation device, and a judge device. The inner product calculation device calculates the inner product of the view vector indicating the shooting direction of the image capture device and the normal vector of the plane of the reference object where the allocated reference subject is formed. The judge device judges that the image capture device can shoot the allocated reference subject when the inner product is negative; this means the reference subject is visible from the shooting point.

Preferably, the judge device includes an occluded region calculation device, and a judge device. The occluded region calculation device calculates a conical occluded region (the region assumed to be blocked by the reference subject from the shooting position candidate) with each predetermined position of the arranged plurality of reference subjects as a vertex and that extends in a direction farther away from the shooting position candidate. The judge device provides judgement that the image capture device can shoot the allocated reference subject when the allocated reference subject is outside the occluded region; this means the reference subject is visible from the shooting point.

Preferably, the evaluation device includes a projection point calculation device, a counter, and a weighting device. The projection point calculation device calculates respective positions of the plurality of projection points on the object image from the arranged plurality of reference subjects according to the shooting position candidate. The counter counts the number of reference subjects located within a predetermined distance from the projection point out of the extracted reference subjects. The weight device applies an evaluation value according to the number of counted reference subjects to the shooting position candidate.

Preferably, the shooting position calculation device further includes a projection point calculation device, a distance calculation device, and a modify device. The projection point calculation device calculates respective positions of the plurality of projection points on the object image from the arranged plurality of reference subjects according to the determined shooting position. The distance calculation device calculates the distance between the projection point and a reference subject that is in the proximity of the extracted reference subject. The modify device modifies the determined shooting position to reduce the evaluation value according to the distance so that the entire distance becomes smaller, for example, so that the sum of the square of the distance, or the sum of the distance is minimized.

Preferably, the shooting position calculation device further includes a judge device. The judge device provides judgment of a reference subject that the image capture device can shoot from the determined shooting position out of the arranged plurality of reference subjects to use the reference subject judged to be shootable in the calculation by the projection point calculation device, and excluding the reference subject judged to be not shootable from the calculation by the projection point calculation device.

Preferably, the three-dimensional modeling apparatus further includes a setting device for newly setting a reference subject at a position other than the position of a reference subject already in the object image.

Preferably, the setting device erases data associated with a reference subject in the object image and registers data associated with another reference subject.

Preferably, the setting device registers data associated with another reference subject in addition to data associated with a reference subject in the object image.

Preferably, the three-dimensional modeling apparatus further includes a memory and a notification device. The shooting position is stored in the memory. The notification device notifies the person (operator) using the image capture device of a position other than a shooting position already stored in the memory. As a position (the next point of view for shooting) other than a shooting position already stored in the memory (shot point of view), a position remote from the stored shooting position, further preferably a position most remote, is selected. Also, a point of view that can acquire a more accurate shape according to the schematic shape information of the object of interest can be selected as the new shooting point of view.

According to the present invention, the camera shooting position is calculated on the basis of the position of a reference subject in an object image obtained by shooting an object of interest together with a plurality of reference subjects arranged at predetermined positions. Therefore, a three-dimensional model can be generated without using a turntable such as in the conventional case. Thus, a simple and economic three-dimensional modeling apparatus can be realized.

Since the reference subjects are arranged irregularly and asymmetrically, it is not necessary to place the object of interest taking into consideration the critical relationship with the position of the reference subject. Therefore, a three-dimensional model can be generated even when the object of interest is larger than the reference sheet or reference object. Furthermore, even when the object of interest is significantly larger than the reference sheet or reference object, a three-dimensional model thereof can be generated by placing a plurality of reference sheets or reference objects around that huge object of interest.

Since the reference subject has an attribute, the space of search in calculating the shooting position becomes smaller. This means that the calculation speed of the shooting position is improved. Also, difference in the attribute can easily be discriminated since the attribute is a color.

Since the camera shooting position is calculated on the basis of a known reference subject, a calculation error will not be accumulated. Also, since the camera shooting position is calculated according to the Hough transform method, extraction error of a reference subject and effect of noise in the object image can be suppressed. Furthermore, the calculation precision can be modified appropriately.

The calculation accuracy of the shooting position is improved since judgement is made whether a reference subject can be shot or not and a predetermined point is applied to the shooting position candidate only when shooting is allowed.

Furthermore, since the number of reference subjects in the proximity of the projection point from the reference subject onto the object image is counted and a point according to that count is applied to the shooting position candidate, the calculation precision of the shooting position is improved.

Furthermore, since the distance between a projection point from a reference subject onto the object image and a reference subject in the proximity thereto is calculated, and the determined shooting position is modified so that the sum of the square of the distance is minimized, the calculation precision of the shooting position is improved. Furthermore, since determination is made whether the reference subject can be shot or not, and the reference subject that can be shot is used for the projection point calculation and the reference subject that cannot be shot is excluded from the projection point calculation, the calculation precision of the shooting position is further improved.

After shooting a reference object together with the reference subject, a new reference subject is set at a position other than the position of a reference subject already in the obtained object image. Therefore, a three-dimensional model of a huge object of interest can be generated.

The calculated shooting position is stored, and a position other than that stored shooting position is notified to the person picking up the image as the next shooting position. Therefore, an object image required to generate a three-dimensional model can be obtained efficiently.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
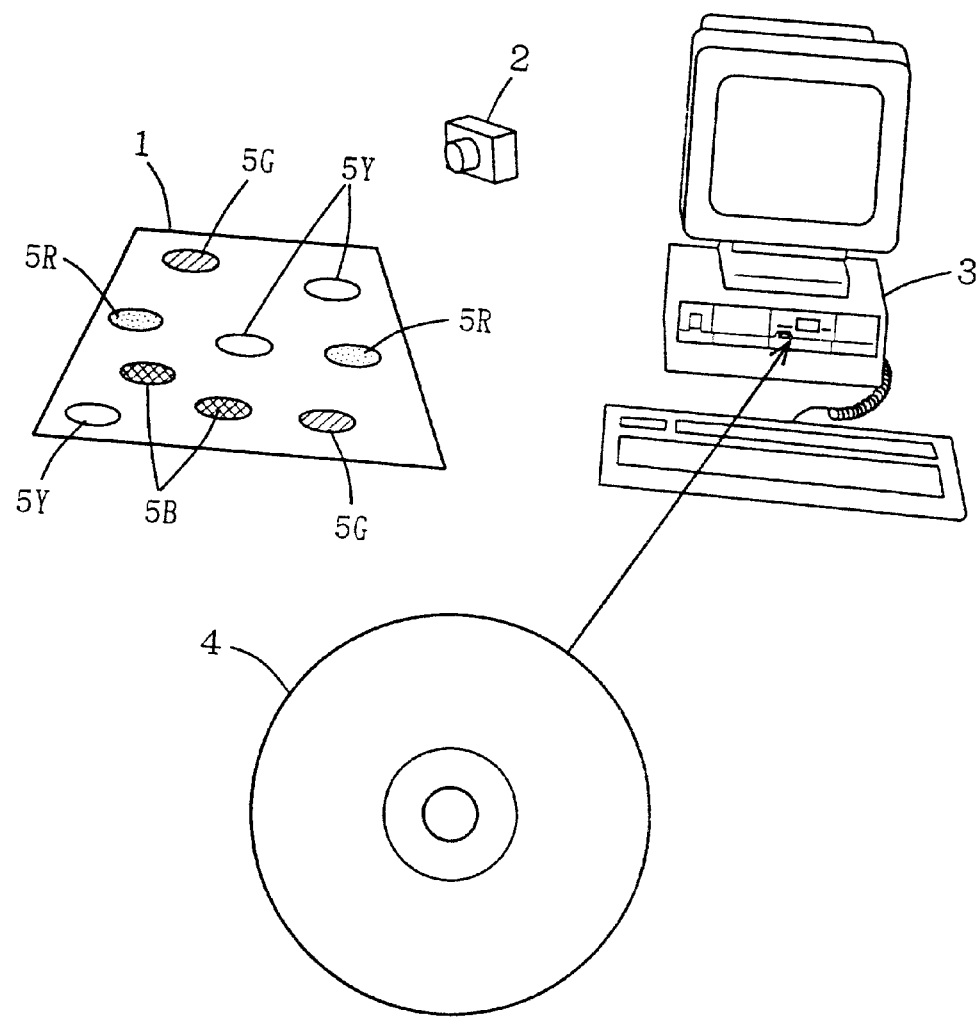
FIG. 1 shows an entire structure of a three-dimensional modeling apparatus according to a first embodiment of the present invention.

Embodiments of the present invention will be described hereinafter with reference to the drawings. Likewise or corresponding components in the drawings have the same reference characters allotted, and their description will not be repeated.

First Embodiment

Referring to FIG. 1, a three-dimensional modeling apparatus according to a first embodiment of the present invention includes a reference sheet 1, a digital still camera 2, a computer 3, and a CD-ROM (Compact Disk—Read Only Memory) 4. A plurality of reference points 5R, 5G, 5B and 5Y arranged at predetermined positions in an irregular and asymmetric manner are formed on reference sheet 1. Digital still camera 2 picks up the image of an object of interest (not shown) from which a three-dimensional model is to be obtained together with reference points 5R, 5G, 5B and 5Y to obtain an object image. Although still camera 2 producing a still picture is used here, a video camera producing a motion picture can be used instead A program is recorded on CD-ROM 4 to be used by computer 3 for generating a three-dimensional model of an object of interest according to an object image obtained through digital still camera 2. Although CD-ROM 4 is used as a medium for recording the program, a floppy disk, a CD-R, a DVD, a memory card, and the like can be used instead.

Figure 2:
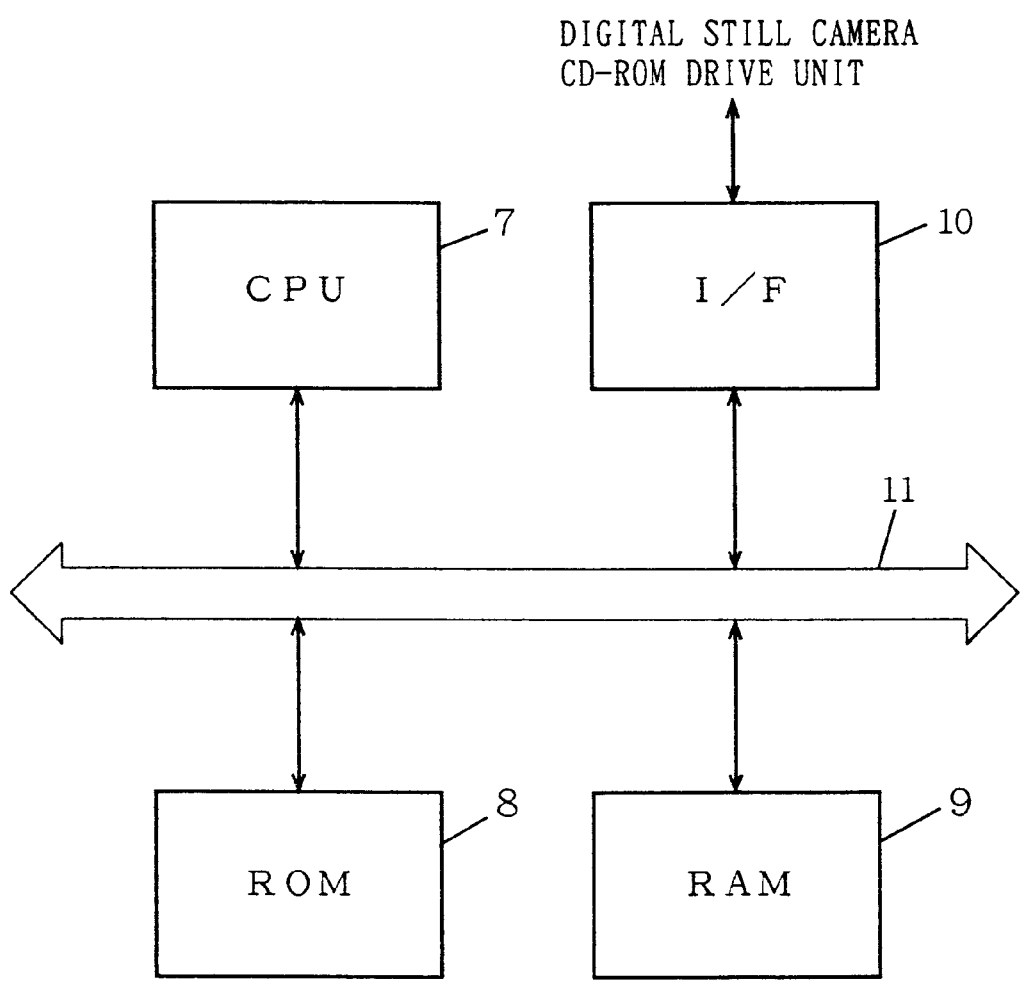
FIG. 2 is a block diagram showing main components of the computer of FIG. 1.

FIG. 2 is a block diagram showing main components of computer 3. Referring to FIG. 2, computer 3 includes a central processing unit (CPU) 7, a read only memory (ROM) 8, a random access memory (RAMA) 9, an input/output interface (I/F) 10, and a data/address bus 11 for connecting CPU 7, ROM 8, RAM 9 and I/F 10 to each other. A drive unit for digital still camera 2 and CD-ROM 4 is connected to I/F 10, whereby an object image obtained by digital still camera 2 and the three-dimensional modeling program recorded in CD-ROM 4 are stored in RAM 9 via I/F 10. CPU 7 carries out an operation according to the program stored in ROM 8 and RAM 9.

Figure 3:
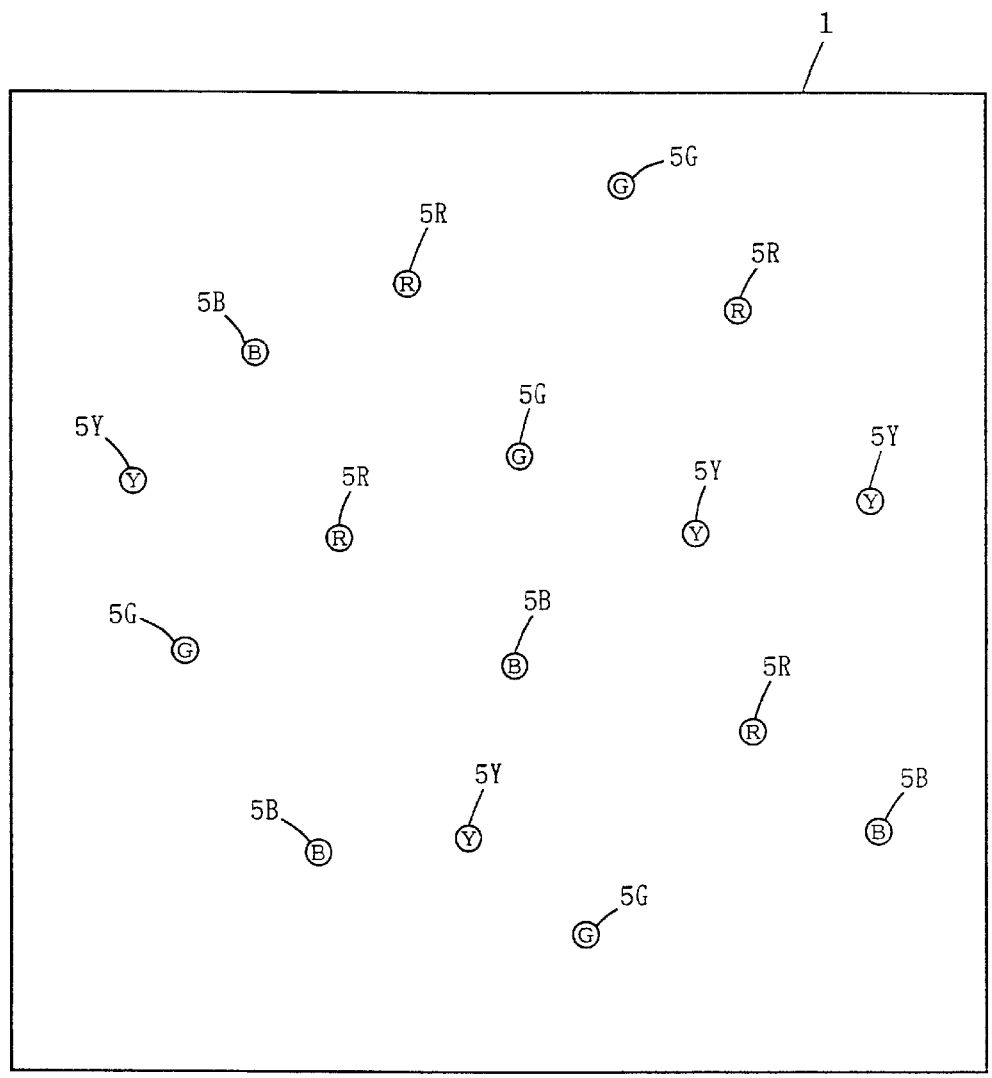
FIG. 3 is a plan view of the reference sheet in FIG. 1.

Referring to the plan view of FIG. 3, reference points 5R, 5G, 5B and 5Y having attributes of four colors are arranged irregularly and asymmetrically at predetermined positions on reference sheet 1. More specifically, reference point 5R has the attribute of the color of red.

Reference point 5G has the attribute of the color of green. Reference point 5B has the attribute of the color of blue. Reference point 5Y has the attribute of the color of yellow. In the strictest sense, reference points 5R, 5G, 5B and 5Y are circles having predetermined areas.

Figure 4B:
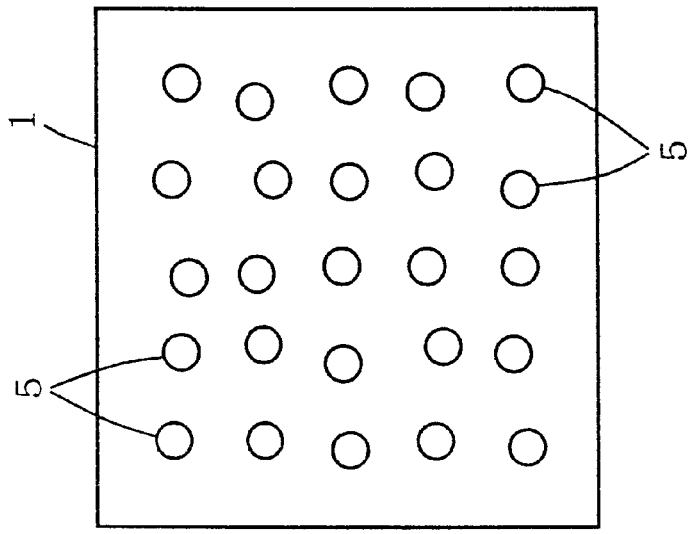
FIGS. 4A and 4B are diagrams for describing the method of arranging the reference points shown in FIG. 3.
Figure 4A:
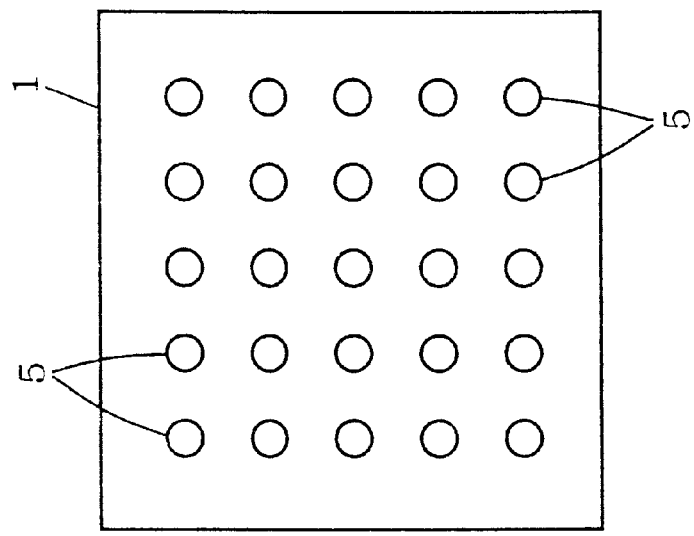

FIGS. 4A and 4B are diagrams for describing the method of arranging reference points 5R, 5G, 5B and 5Y shown in FIG. 3. First, reference points 5 are arranged regularly as shown in FIG. 4A. Then, the regular arrangement is changed according to intuition as shown in FIG. 4B. Thus, the arrangement of reference points 5 is rendered irregular and asymmetric. It is also desirable to disperse reference points 5 appropriately in addition to the irregular and asymmetric fashion.

Figure 5A:
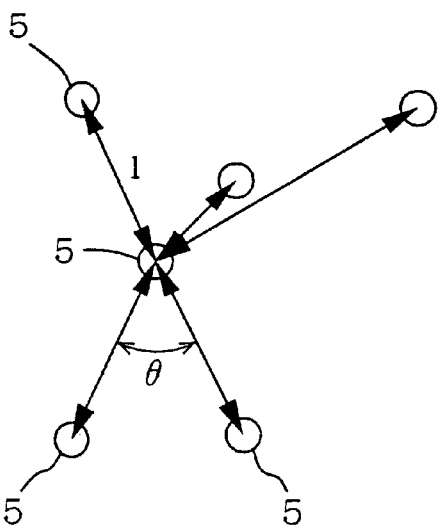
FIGS. 5A–5C are diagrams for describing the evaluation method of dispersion of the arrangement of the reference points obtained by the method of FIGS. 4A and 4B.
Figure 5B:
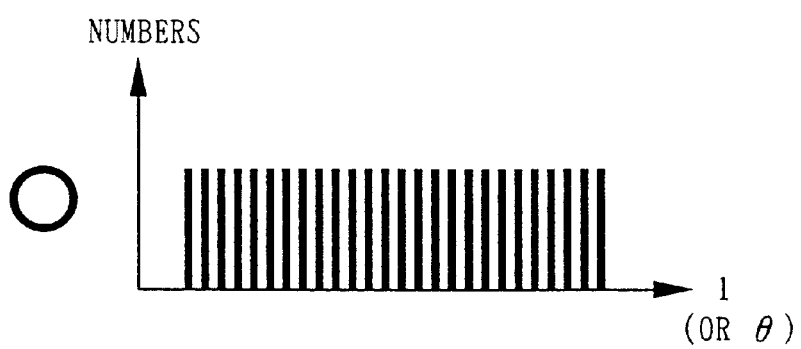
Figure 5C:
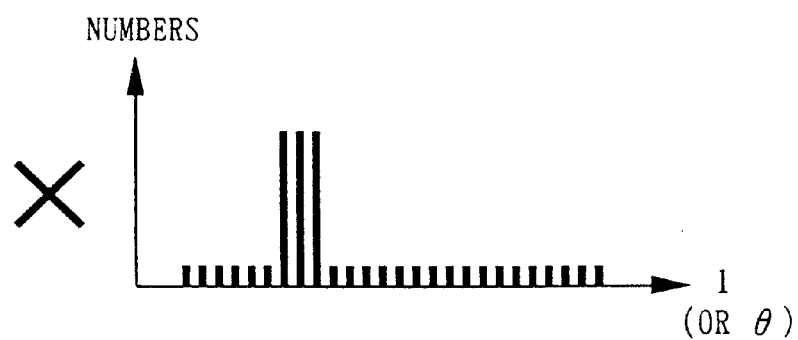

FIGS. 5A–5C are diagrams for describing the method of evaluating the dispersion of the arrangement of reference points 5 shifted as shown in FIG. 4B. Referring to FIG. 5A, the distance from a certain one reference point 5 to another reference point 5 is set as l. The angle between two direction vectors from that one certain reference point 5 to two other reference points 5 is set as θ. FIGS. 5B and 5C show the distribution indicating distance l and the number of reference points 5 at that distance l. As a result of measuring distance l for all reference points 5, the distribution of the number of reference points 5 having distance l becomes uniform as shown in FIG. 5B by arranging reference point 5 to have various distances of l. If reference points 5 are arranged in an unbalanced manner, the distribution will not become uniform as shown in FIG. 5C. Evaluation of angle θ can be effected in a manner similar to that of distance l. More specifically, the number of reference points 5 at angle θ is counted instead of distance l of FIGS. 5B and 5C. By arranging reference points 5 so as to have various angles θ, the distribution of the number of reference points 5 having the angle of θ will become uniform as shown in FIG. 5B. It is therefore desirable to determine the arrangement of reference points 5 so that the distribution for both distance l and angle θ are uniform as shown in FIG. 5B.

Figure 6:
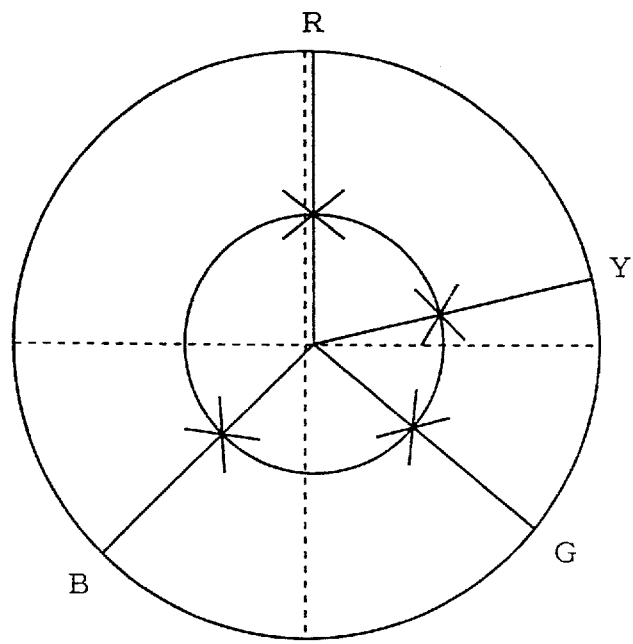
FIG. 6 is a diagram showing the hue plane at an HSV space for describing the color to be selected in an attribute of a reference point.
Figure 8:
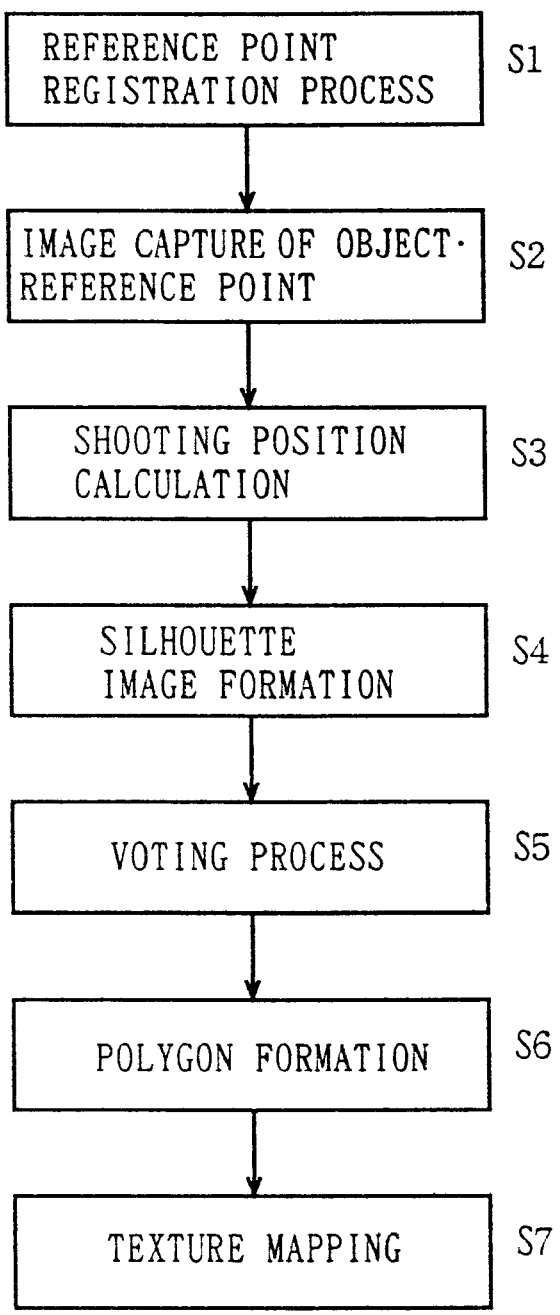
FIG. 8 is a flow chart showing a method of generating a three-dimensional model of an object of interest using the three-dimensional modeling apparatus of FIG. 1.

Although four colors of red, green, blue and yellow are selected as the attribute of reference points 5, it is desirable to select a color of a completely different hue in order to facilitate identification of the color. FIG. 8 is a diagram showing the hue plane in an HSV (Hue; Saturation; Value) space. Here, yellow is selected in addition to the three colors of red, green and blue that differ by 120 degrees in hue from each other. Alternatively, the method of selecting four colors differing 90 degrees from each other in hue (indicated by the broken line in FIG. 6) can be employed when four colors are to be selected.

Figure 7:
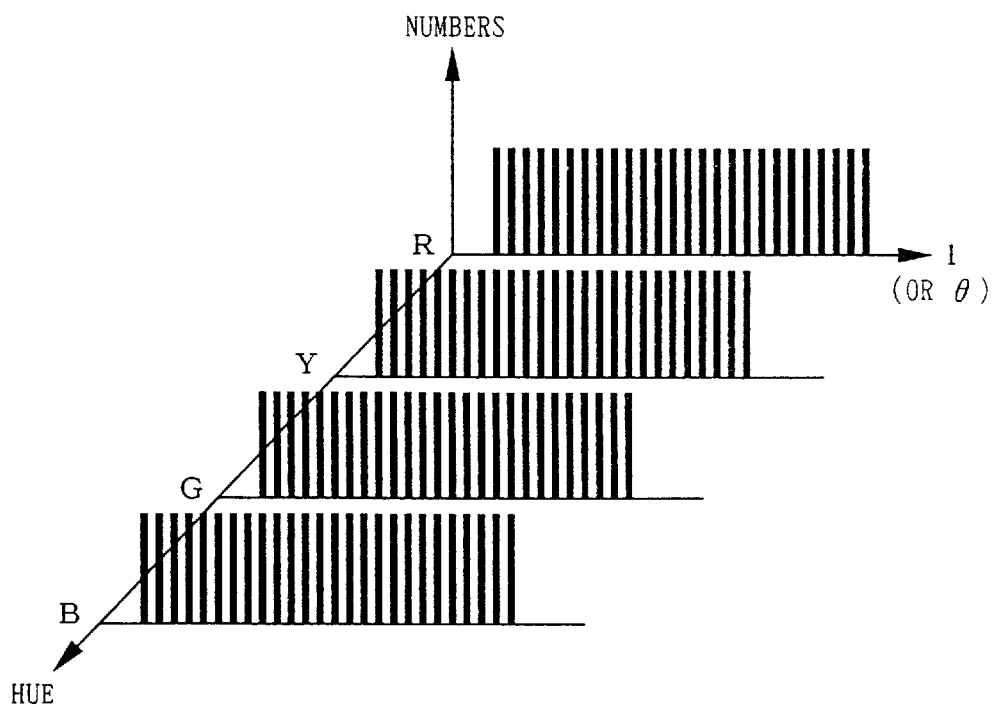
FIG. 7 is a diagram for describing the evaluation method of dispersion of the arrangement of the reference points obtained by the method of FIGS. 4A and 4B taking into account color attributes.

When the attributes of four colors are allocated to reference points 5, it is desirable to disperse the arrangement of reference point 5 for each color. FIG. 7 shows the distribution of distance l (or angle θ) and the number of reference points at that distance l (or angle θ) when the four colors of red, yellow, green and blue are employed as the attribute for reference points 5. As shown in FIG. 7, it is desirable to evaluate the arrangement of reference points 5 for each color when color is employed as the attribute of reference point 5. In this case, reference points 5 are arranged so that the distribution of reference points 5 is uniform for each color.

Although the HSV space is used as the color space, another color space can appropriately be used instead.

Although the method of obtaining irregular and asymmetric arrangement by shifting the regular arrangement of reference points 5 by intuition has been described above, an alternative method can be used. For example, the arrangement of reference points 5 is found by generating random numbers, and then determining the irregularity and asymmetric level by the above-described evaluation method. An arrangement determined as satisfying the desired irregular level and asymmetric level sufficiently can be employed.

Figure 9A:
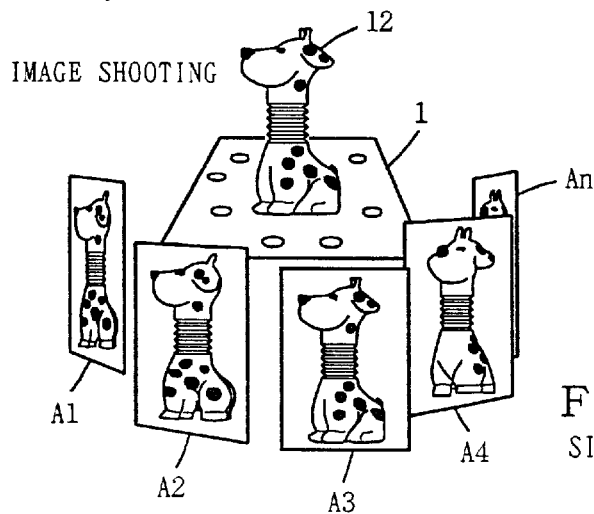
FIGS. 9A, 9B, 9C, 9D and 9E are diagrams for describing a step of shooting an object of interest, a step of generating a silhouette image, a step of carrying out a voting process, a step of generating a polygon, and a step of mapping the texture, respectively, of the flow chart of FIG. 8.
Figure 9B:
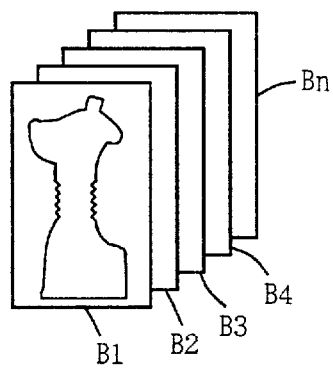
Figure 9C:
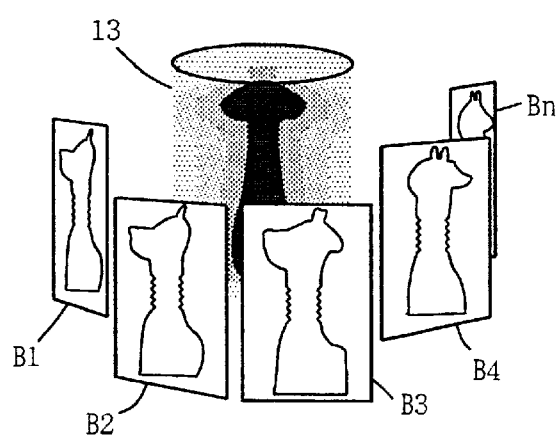
Figure 9D:
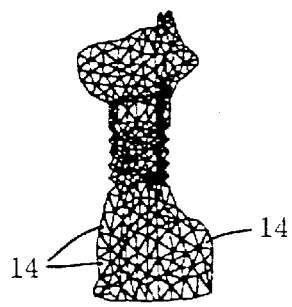
Figure 9E:
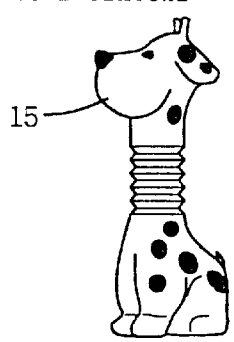

FIG. 8 is a flow chart showing a three-dimensional modeling program recorded on CD-ROM 4 of FIG. 1. FIG. 9A corresponds to a step S2 for shooting an object of interest with a reference point. FIG. 9B corresponds to a step S4 for generating a silhouette image. FIG. 9C corresponds to a step S5 of the voting process. FIG. 9D corresponds to a step S6 for generating a polygon. FIG. 9E corresponds to a step S7 of texture mapping.

Referring to FIGS. 1, 2, 8 and 9A–9E, a reference point registration process is carried out at step S1 for registering the positions of reference points 5R, 5G, 5B and 5Y into RAM 9.

At step S2, an object of interest 12 is shot from a plurality of positions through digital still camera 2 to obtain a plurality of object images A1–An. Since object 12 is placed on reference sheet 1, object 12 is shot together with reference points 5R, 5G, 5B and 5Y on reference sheet 1. Not all the reference points 5R, 5G, 5B and 5Y have to be shot. Only a majority of the reference points are required.

At step S3, the shooting position of digital camera 2 is calculated according to the positions of reference points 5R, 5G, 5B and 5Y in object images A1–An. This shooting position is calculated according to the Hough transform method shown in the flow chart of FIG. 10. Hough transformation is a method of calculating the three-dimensional position of an object in an image shot in an automatic production line and the like. For example, this method is disclosed by J. Illingworth and J. Kittler in "A Survey of the Hough Transform", Calculation Device Vision, Graphics and Image Processing (CVGIP) 44, 1988, pp. 87–116. Although the Hough transform method is used here, any method can be used instead as long as the shooting position of camera 2 can be calculated according to the positions of reference points 5R, 5G, 5B and 5Y in object images A1–An. For example, the aforementioned factorization method can be used instead.

At step S4, a silhouette image is generated according to the well known image subtraction method. More specifically, subtraction is carried out between object images A1–An and a background image shot in advance to produce a plurality of silhouette images B1–Bn as shown in FIG. 9B. In the subtraction, the difference between the color signal level of the object image and the color signal level of the background image is calculated for each pixel. Although the contour of the object of interest in object images A1–An is extracted using the image subtraction method, the well known stereo method can be used instead. In the stereo method, an object of interest 12 is shot by a binocular camera, and object 12 is differentiated from the background according to the depth information in the taken image.

At step S5, the well known voting process is carried out. More specifically, score voting is implemented to Voxel space 13 according to the plurality of silhouette images B1–Bn. The area having the number of votes greater than a predetermined number is the region where object of interest 12 is present. A stereoscopic shape of object 12 is obtained thereby.

At step S6, a polygon 14 of a triangular patch is generated according to the stereoscopic configuration of object 12 obtained by step S5. Therefore, the stereoscopic shape of object 12 is represented by a plurality of polygons 14. The stereoscopic shape represented by polygons 14 is stored in RAM 9.

At step S7, a corresponding texture is mapped to each polygon 14 generated at step S6. As a result, a three-dimensional model 15 corresponding to object 12 of interest is obtained. The texture is the color information obtained from object images A1–An, and is stored in RAM 9.

The above-described steps S4–S7 for generating a three-dimensional model 15 according to object images A1–An and the shooting position of camera 2 can be implemented by well known methods other than those described above. Also, the processes of steps S3–S7 are executed by CPU 7 according to the program stored in RAM 9.

Although the Voxel space of the cylindrical coordinate system is employed in FIG. 9C, Voxel space of the orthogonal coordinate system can be used instead.

Figure 10:
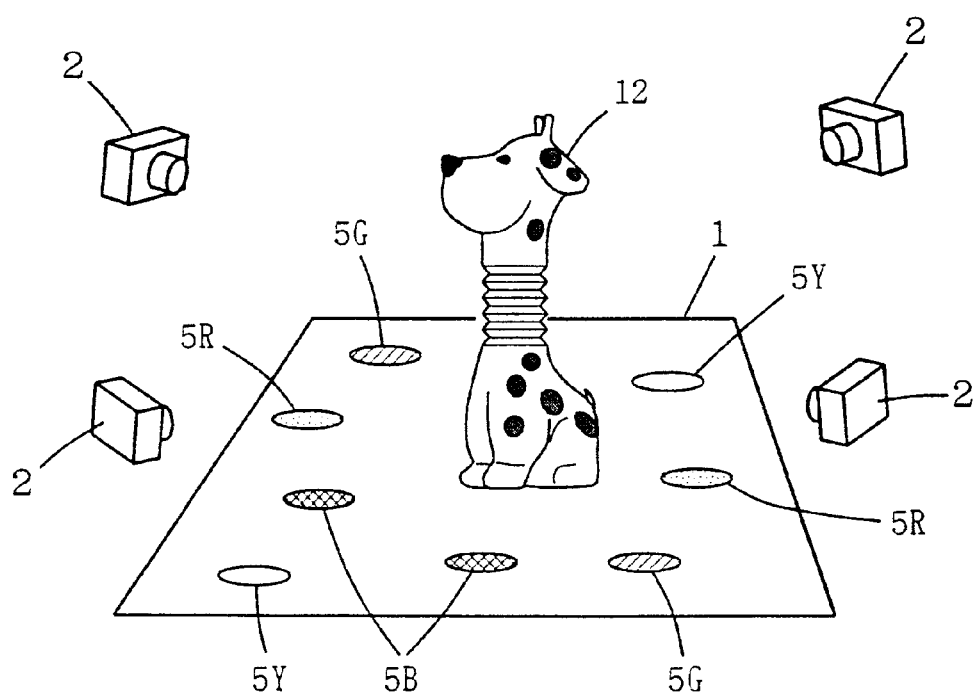
FIG. 10 is a diagram for describing a step of shooting an object of interest together with a reference point similar to the step of FIG. 9A.

The method of generating a three-dimensional model 15 of object 12 using the three-dimensional modeling apparatus of the above structure will be described hereinafter. Referring to FIG. 10, reference sheet 1 is placed on a flat location. An object 12 of interest from which three-dimensional model 15 is to be generated is placed on reference sheet 1.

Figure 11:
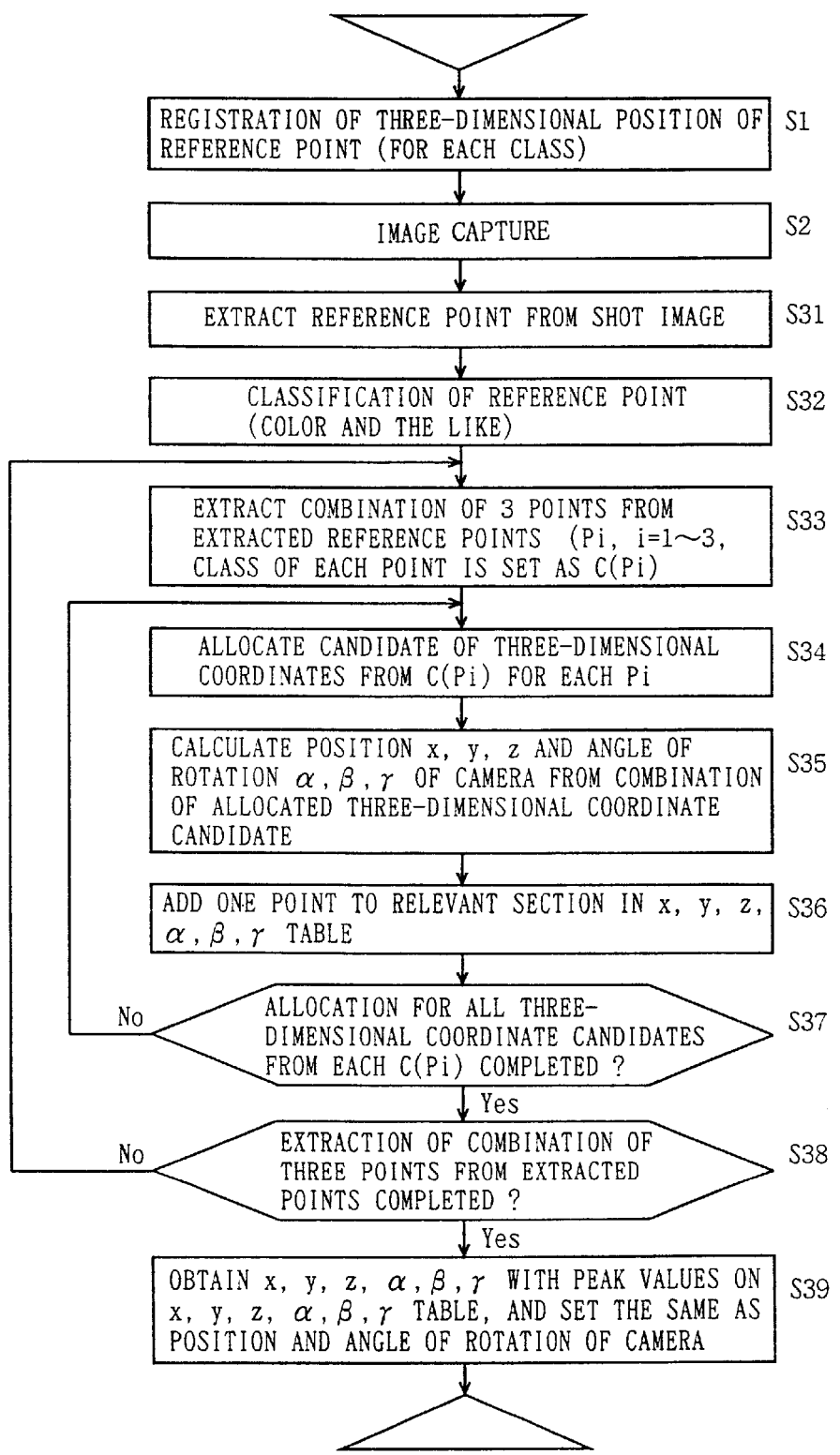
FIG. 11 is a flow chart showing the steps of reference point registration process, shooting, and shooting position calculation steps of FIG. 8 in further detail.

Referring to the flow chart of FIG. 11, the position data of reference points 5R, 5G, 5B and 5Y on reference sheet 1 is stored into RAM 9 for each color (class) at step S1. Here, the position data has the origin set at an arbitrary position on, for example, reference sheet 1. The coordinates symmetrical to this origin are used. This position data is preferably prerecorded in CD-ROM 4 so that the position data will be stored together into RAM 9 when the above-described three-dimensional modeling program is installed into computer 3.

At step S2, object 12 is shot with digital still camera 2 as shown in FIG. 10. Here, not only object 12, but also reference points 5R, 5G, 5B and 5Y are shot. It is desirable to shoot object 12 from various positions without any localization in order to produce a complete three-dimensional model. By picking up the image of object 12 from a plurality of positions, data of a plurality of object images is stored in the memory (not shown) in digital still camera 2. Then, digital still camera 2 is connected to I/F 10 of computer 3. The data of the object image stored in the memory digital still camera 2 is transferred to RAM 9 via I/F 10.

At step S3 (FIG. 8), CPU 7 calculates the shooting position of digital still camera 2 for each of object images A1–An according to the flow chart (steps S31–S39) shown in FIG. 11.

More specifically, at step S31, reference points 5R, 5G, 5B and 5Y are extracted from the taken images A1–An. Since reference points 5R, 5G, 5B and 5Y are arranged irregularly and asymmetrically, the shooting position of camera 2 can be identified by comparing the position of the extracted reference points 5R, 5G, 5B and 5Y with the position of reference points 5L, 5G, 5B and 5Y registered previously at step S1.

At step S32, the extracted reference points 5R, 5G, 5B and 5Y are classified into the four classes of red, green, blue and yellow.

At step S33, three reference points from the extracted reference points 5R, 5G, 5B and 5Y are arbitrarily selected. The selected three reference points do not necessarily have to be of different colors (class) nor of the same color (class). Therefore, when 4n reference points (n points for each color) are extracted from the object images, there are $_{4n}P_3$ combinations. Here, it is assumed that the three selected reference points are P1, P2, P3, and their class is C(Pi).

Figure 12A:
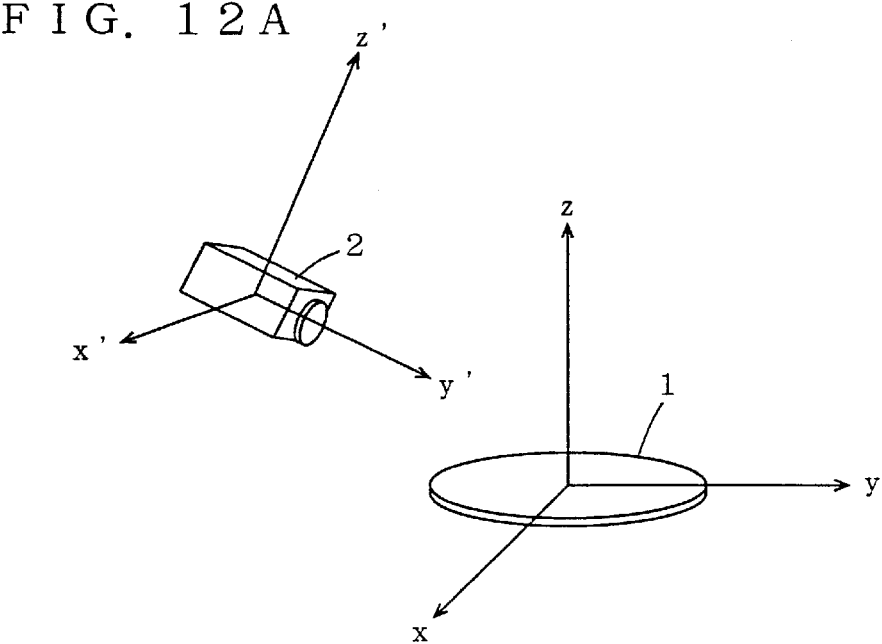
FIGS. 12A–12C are diagrams for describing definition of a variable representing the shooting position and angle of rotation of the digital still camera of FIG. 1.
Figure 12B:
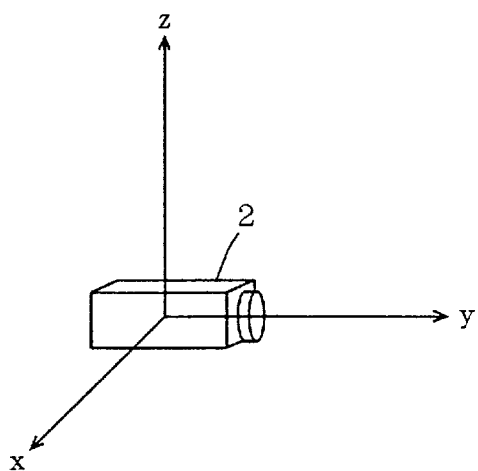
Figure 12C:
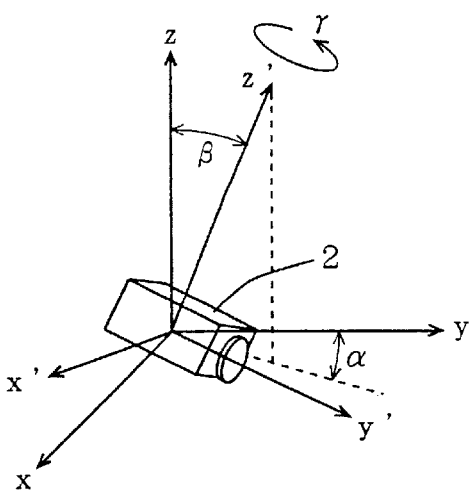

At step S34, a candidate of three-dimensional coordinates representing a position of any of reference point 5R, 5G, 5B and 5Y on reference sheet 1 is sequentially allocated appropriately for each reference point Pi(i=1–3). More specifically, correspondence is established between each of the three selected reference points P1, P2 and P3 with any one of the plurality of reference points 5R, 5G, 5B, and 5Y on reference sheet 1 of the same color. The position of the corresponding reference point is allocated as the position candidate. For example, when the selected reference point P1 is green, one arbitrary green reference point 5G on reference sheet 1 is set to correspond to reference point P1. The position data of this corresponding reference point 5G is read out from RAM 9 to become the position candidate of the selected reference point P1. At step 35, the position x, y, z and angle of rotation (posture) $\alpha$, $\beta$, and $\gamma$ of camera 2 are calculated according to the combination of the allocated candidates of the three-dimensional coordinates. Here, the calculated positions x, y, and z and angle of rotation $\alpha$, $\beta$, and $\gamma$ are shooting position candidates of camera 2 when the above-allocated candidates of the three-dimensional coordinates are correct. Here, variables x, y, z, $\alpha$, $\beta$, and $\gamma$ representing the shooting position of camera 2 are defined as shown in FIGS. 12A–12C. More specifically, as shown in FIG. 12A, the plane of reference sheet 1 is set as the xy plane (z=0). Therefore, z is the height from reference sheet 1. Also, the posture of camera 2 is represented by the x', y', z' coordinates. The optical axis of camera 2 matches the y' axis. The angle of rotation $\alpha$, $\beta$, and $\gamma$ of camera 2 is defined according to the Eulerain angle. More specifically, the basic posture of camera 2 on the xyz coordinate is defined as shown in FIG. 12B. By rotating camera 2 at this standard posture by $\gamma$ about the z axis as shown in FIG. 12C, then rotating by $\beta$ about the x axis, and then rotating by $\alpha$ about the z axis, the actual posture of camera 2 is achieved. The angle of rotation $\alpha$, $\beta$, and $\gamma$ at this stage is the Eulerain angle.

Figure 13:
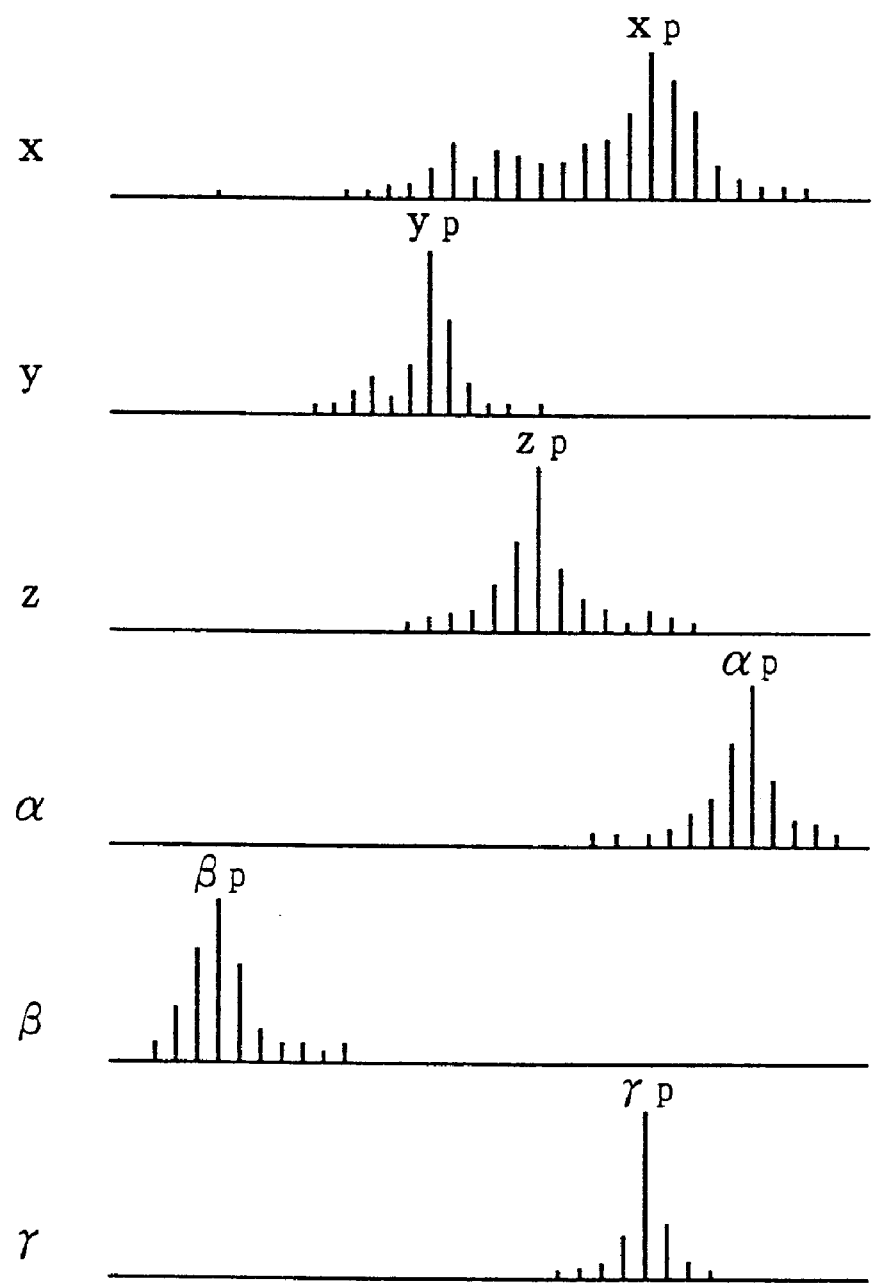
FIG. 13 is a Hough table used in the Hough transform method of FIG. 11.

The values of position x, y, z and angle of rotation $\alpha$, $\beta$, $\gamma$ of camera 2 obtained at step S35 are not always correct since they have been obtained by appropriately allocating the candidates of the three-dimensional coordinates to the three reference points P1, P2 and P3. Therefore, at step S36, one point is voted to respective relevant positions in the Hough table as shown in FIG. 13 as the possibility of the obtained x, y, z, $\alpha$, $\beta$, $\gamma$ being correct. In the table of FIG. 13, the axis of abscissa indicates the value of each variable, and the axis of ordinate indicates the number of votes.

At step S37, determination is made whether the allocation of the coordinates at step S34 has been carried out for all the coordinates. The process of step S38 is carried out when the allocation of the three-dimensional coordinate candidates has completely ended.

At step S38, determination is made whether the selection of three reference points of step S33 has been carried out for all the combinations. When three reference points for each class has been selected for all the combinations from the extracted reference points, the process of step S39 is carried out.

At step S39, the values $x_p$, $y_p$, $z_p$, $\alpha_p$, $\beta_p$, $\gamma_p$ having the greatest number of votes in the table of FIG. 13 are determined as the position and angle of rotation of camera 2.

According to the shooting position of camera 2 calculated as described above and object images A1–An, three-dimensional model 15 is generated according to the well known method described with reference to FIGS. 8 and 9A–9E.

According to the first embodiment of the present invention, an object of interest 12 is shot together with reference points 5R, 5G, 5B and 5Y arranged at known positions, and the shooting position of camera 2 is calculated according to the positions of the taken reference points 5R, 5G, 5B and 5Y. Therefore, a simple and economic three-dimensional modeling apparatus employing reference sheet 1 can be realized without requiring a turntable as in the conventional case.

Since reference points 5R, 5G, 5B and 5Y are arranged irregularly and asymmetrically, an object of interest 12 can be placed at an arbitrary position relative to reference sheet 1. In other words, the object of interest 12 does not have to be placed strictly taking into consideration the position relationship with reference points 5R, 5G, 5B and 5Y. Therefore, an object of interest even greater in size than reference sheet 1 can have a three-dimensional model generated therefrom by placing reference sheet 1 in the proximity of the huge object of interest.

Figure 14:
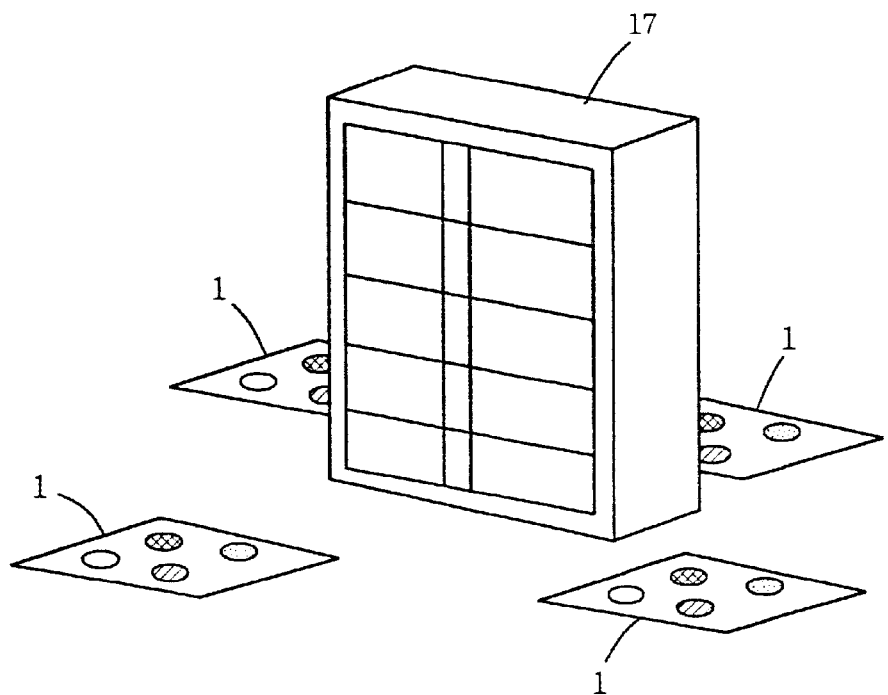
FIG. 14 is a diagram for describing a generation method of a three-dimensional model of a huge object of interest using the three-dimensional modeling apparatus of FIG. 1.

Even in the case where an object of interest 17 from which a three-dimensional model is to be generated is significantly greater than reference sheet 1 as shown in FIG. 14, a three-dimensional model of object 17 can be generated by placing a plurality of reference sheets 1 around the object of interest 17. In this case, the arrangement of the reference points of reference sheet 1 is preferably different from each other. However, the arrangement of the reference sheets may be identical. This is because respective reference sheets 1 can be identified by placing reference sheets 1 irregularly when the reference point arrangement is identical to each other. In the case where the arrangement of the reference points of reference sheet 1 is identical, the versatility of reference sheet 1 is improved.

Since the shooting position is calculated independently for each shooting, calculation error will not be sequentially accumulated. A complete three-dimensional model over the entire circumference of an object of interest can be generated. Also, by altering the resolution (the number of values that can be taken by each variable) of the Hough table shown in FIG. 13, the calculation precision of the camera position can be modified appropriately. A lower resolution of the Hough table results in lower calculation precision of the camera position. However, the calculation speed of the camera position is improved. If the resolution of the Hough table is increased, the process in speed will take longer. However, the calculation precision of the camera position is increased.

The color attribute of reference points 5R, 5G, 5B and 5Y provides the advantage that the calculation amount of combination for determining position x, y, z and angle of rotation $\alpha$, $\beta$, $\gamma$ becomes smaller than the case where no attribute is allocated to the reference point. This advantage results in speeding up the calculation of the camera position.

In addition to color, the shape of ○, Δ, and □ can be applied as the attribute of a reference point. Also, the linear information of whether the reference point is connected at the edge can be applied as an attribute. For example, when a huge object of interest such as a house is to be modeled, the corner of the outside wall of the house can be adopted as the reference point. More specifically, the ridge of the outer wall of the house is extracted by edge detection. By setting the intersection point of the ridges as a reference point, the time required for calculating the above-described combination can be reduced significantly.

Figure 15:
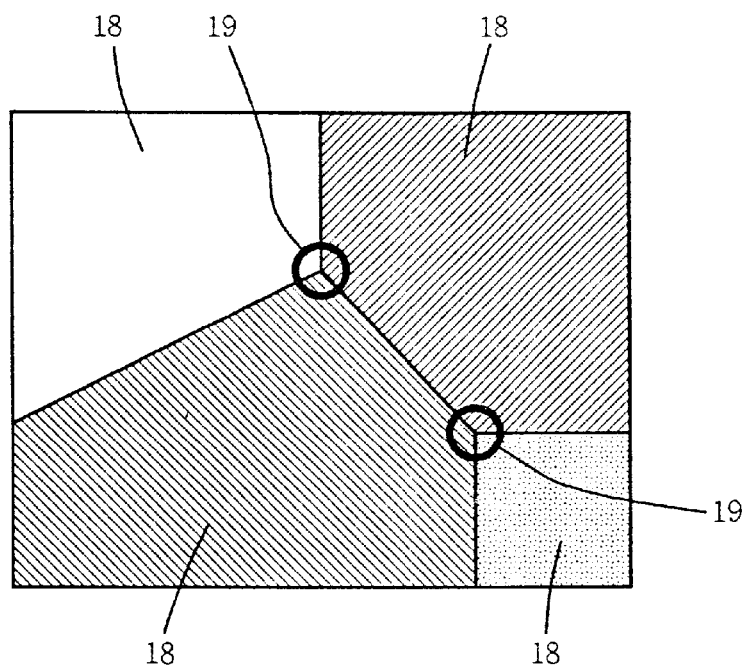
FIG. 15 is a plan view of a portion of a reference sheet showing another example of the attribute of a reference point.

In the first embodiment, one color is applied as the attribute for one reference point. However, as shown in FIG. 15, a reference sheet divided into a plurality of color regions 18 can be used, wherein the intersecting points of the border lines of color region 18 can be set as a reference point 19. In this case, the attribute is applied of which color region 18 each reference point 19 is the intersection point.

In the first embodiment, three reference points are selected to calculate the position and angle of rotation of the camera. However, four or more reference points can be selected.

Figure 16:
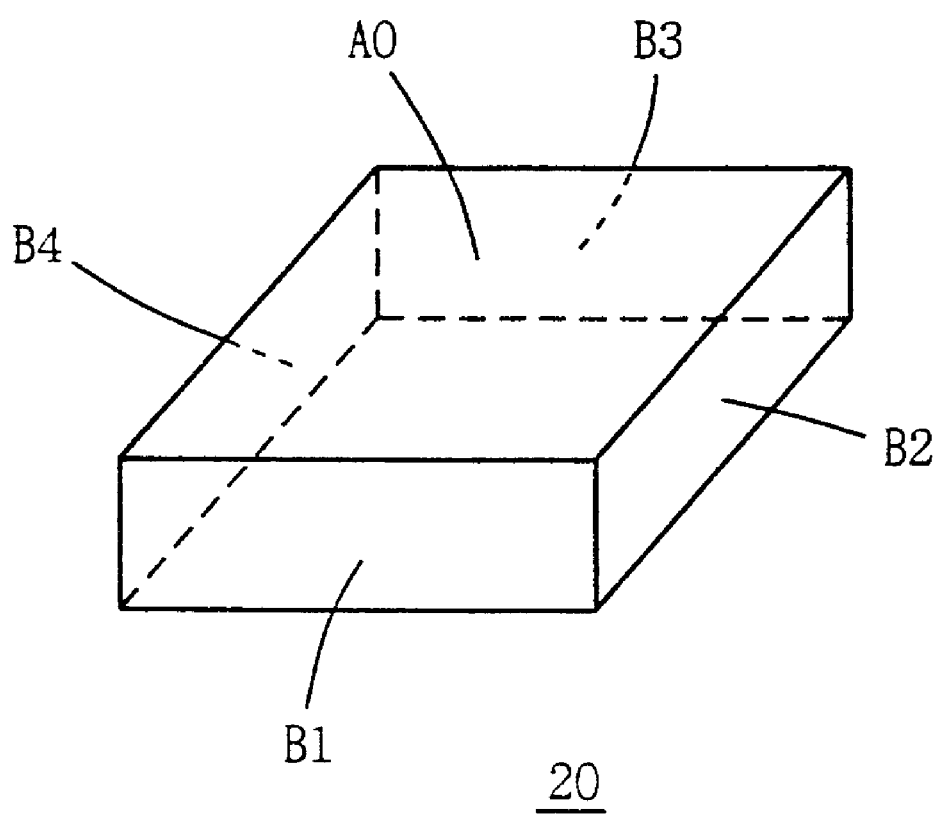
FIG. 16 is a perspective view showing a reference object as an alternative to the reference sheet of FIG. 1.
Figure 17:
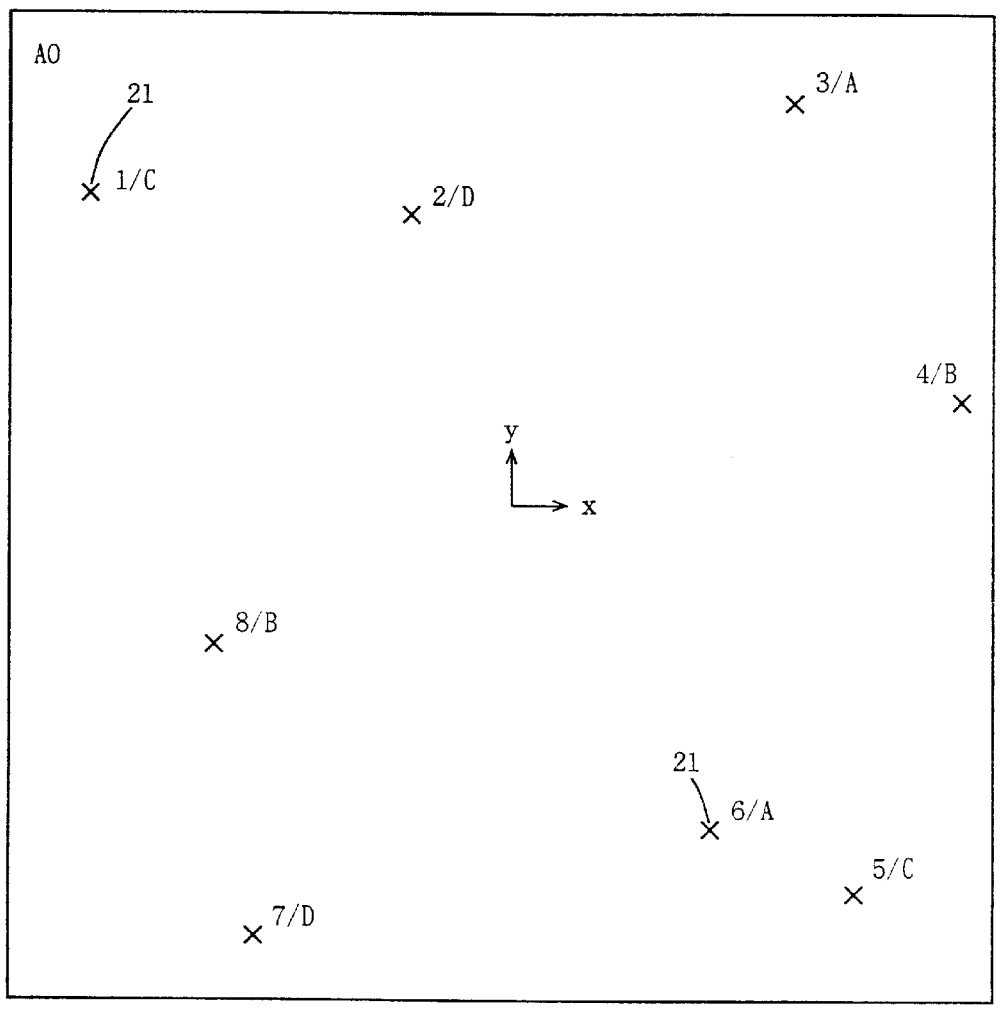
FIG. 17 is a plan view of the reference object of FIG. 16.
Figure 18A:
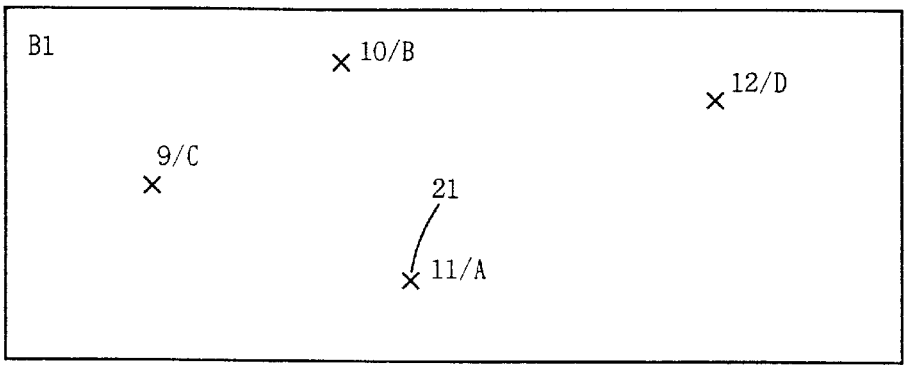
FIGS. 18A, 18B, 18C and 18D are a front view, a right side view, a back view and a left side view, respectively, of the reference object of FIG. 16.
Figure 18B:
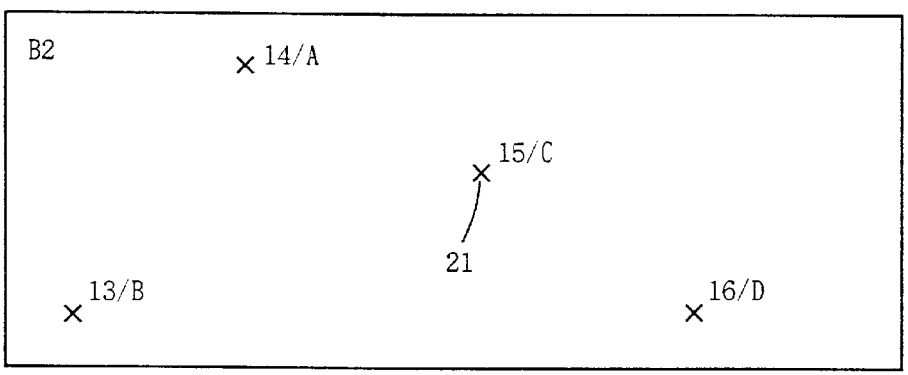
Figure 18C:
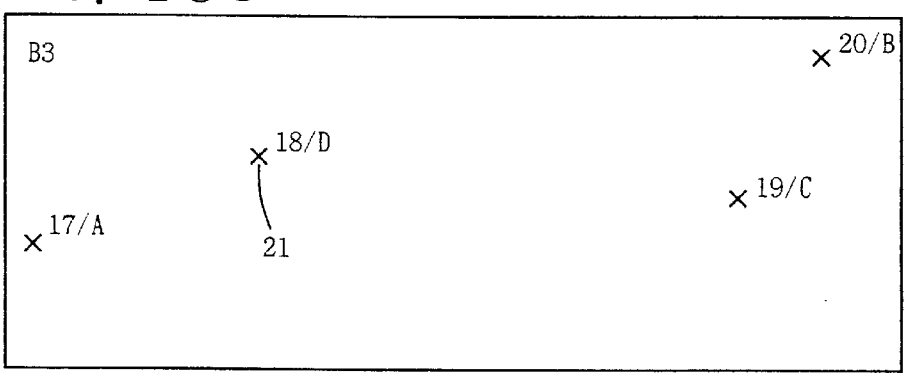
Figure 18D:
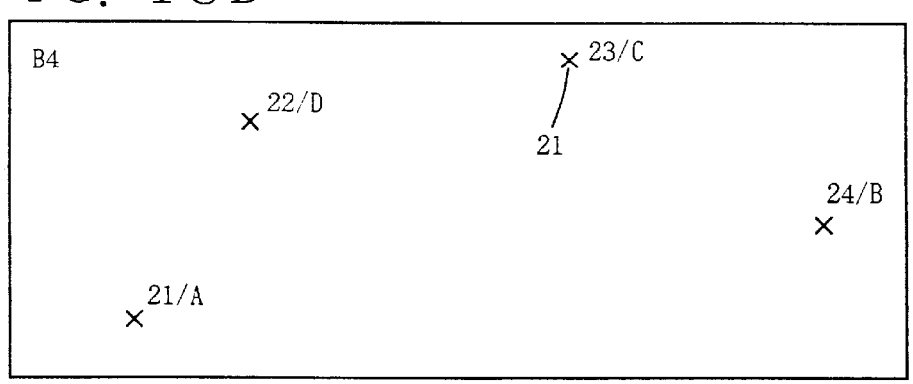

Although a flat reference sheet 1 is used in the first embodiment, a cubic reference body 20 as shown in FIG. 16 can be used instead. Reference points 21 are arranged irregularly and asymmetrically at predetermined positions on the five planes A0, B1–B4 of reference object 20, as shown in FIGS. 17 and 18A–18D. In these figures, the label "1/A" denoted in the proximity of a reference point 21 implies that the identification number of the reference point is "1" and the attribute is "A" (for example, red).

The following Table 1 shows the coordinates x, y, z of the reference points shown in FIGS. 17 and 18A–18D.

TABLE 1

| Plane | Identification Number | Attribute | x | y | z |
|---|---|---|---|---|---|
| A0 | 1 | C | −84 | 63 | 0 |
|  | 2 | D | −19 | 59.5 | 0 |
|  | 3 | A | 58 | 82 | 0 |
|  | 4 | B | 91.5 | 21.5 | 0 |
|  | 5 | C | 68 | −77 | 0 |
|  | 6 | A | 39.5 | −64.5 | 0 |
|  | 7 | D | −52 | −86 | 0 |
|  | 8 | B | −60 | −28 | 0 |
| B1 | 9 | C | −68 | −100 | −39.5 |
|  | 10 | B | −26 | −100 | −12 |
|  | 11 | A | −10.5 | −100 | −61 |
|  | 12 | D | 58.5 | −100 | −20.5 |
| B2 | 13 | B | 100 | −84 | −68 |
|  | 14 | A | 100 | −46.5 | −12 |
|  | 15 | C | 100 | 6.5 | −35.5 |
|  | 16 | D | 100 | 54.5 | −67 |
| B3 | 17 | A | 92 | 100 | −51.5 |
|  | 18 | D | 42 | 100 | −32 |
|  | 19 | C | −64.5 | 100 | −42 |
|  | 20 | B | −82.5 | 100 | −10.5 |
| B4 | 21 | A | −100 | 71 | −68 |
|  | 22 | D | −100 | 46.5 | −23.5 |
|  | 23 | C | −100 | −25 | −10 |
|  | 24 | B | −100 | −81.5 | −45.5 |

Figure 19:
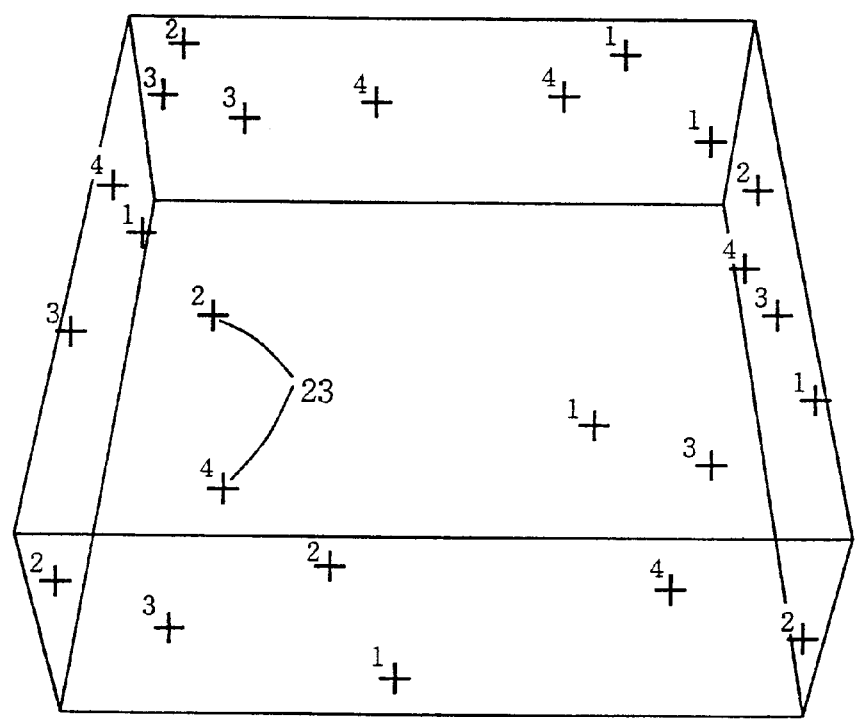
FIG. 19 is a perspective view showing another example of a reference object as an alternative to the reference sheet of FIG. 1.

The reference object is not limited to a cuboid, and may be a hexahedron as shown in FIG. 19. There is no limitation in the shape thereof. Reference points 23 are formed in each plane of reference object 22. The numeric value near each reference point 23 indicates the attribute.

The reference subject represented by the above-described reference points has no limitation in its shape and the like as long as it can become the reference of positioning. Furthermore, an attribute does not have to be applied to the reference point in contrast to the above-described embodiment.

Second Embodiment

Figure 20:
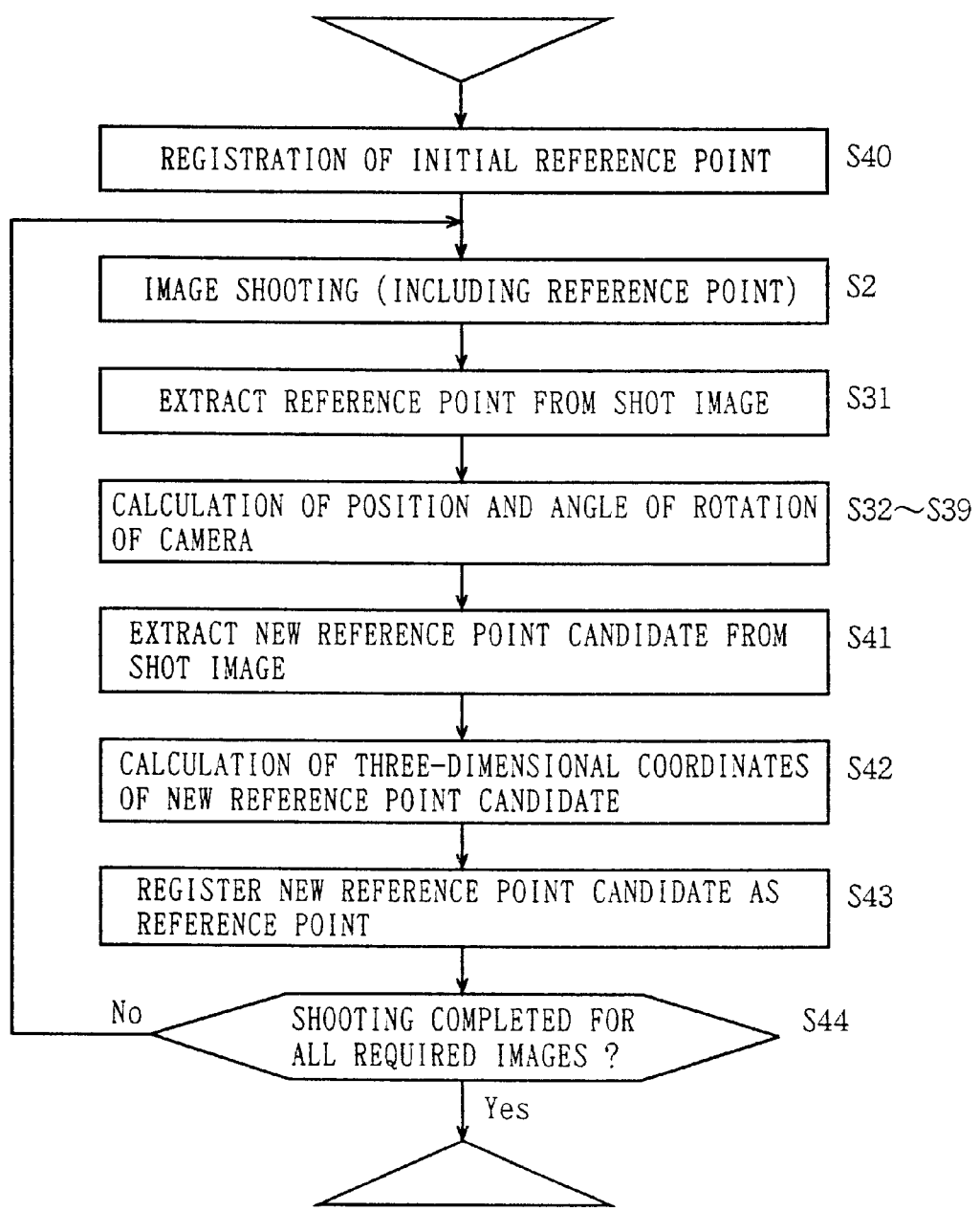
FIG. 20 is a flow chart showing main components of a three-dimensional modeling apparatus according to a second embodiment of the present invention.

FIG. 20 is a flow chart showing main components of a three-dimensional modeling apparatus according to a second embodiment of the present invention. Referring to FIG. 20, steps S31–S39 and steps S41–S44 correspond to the program for generating a three-dimensional model of an object of interest by a computer. This program is recorded in CD-ROM 4.

Figure 21:
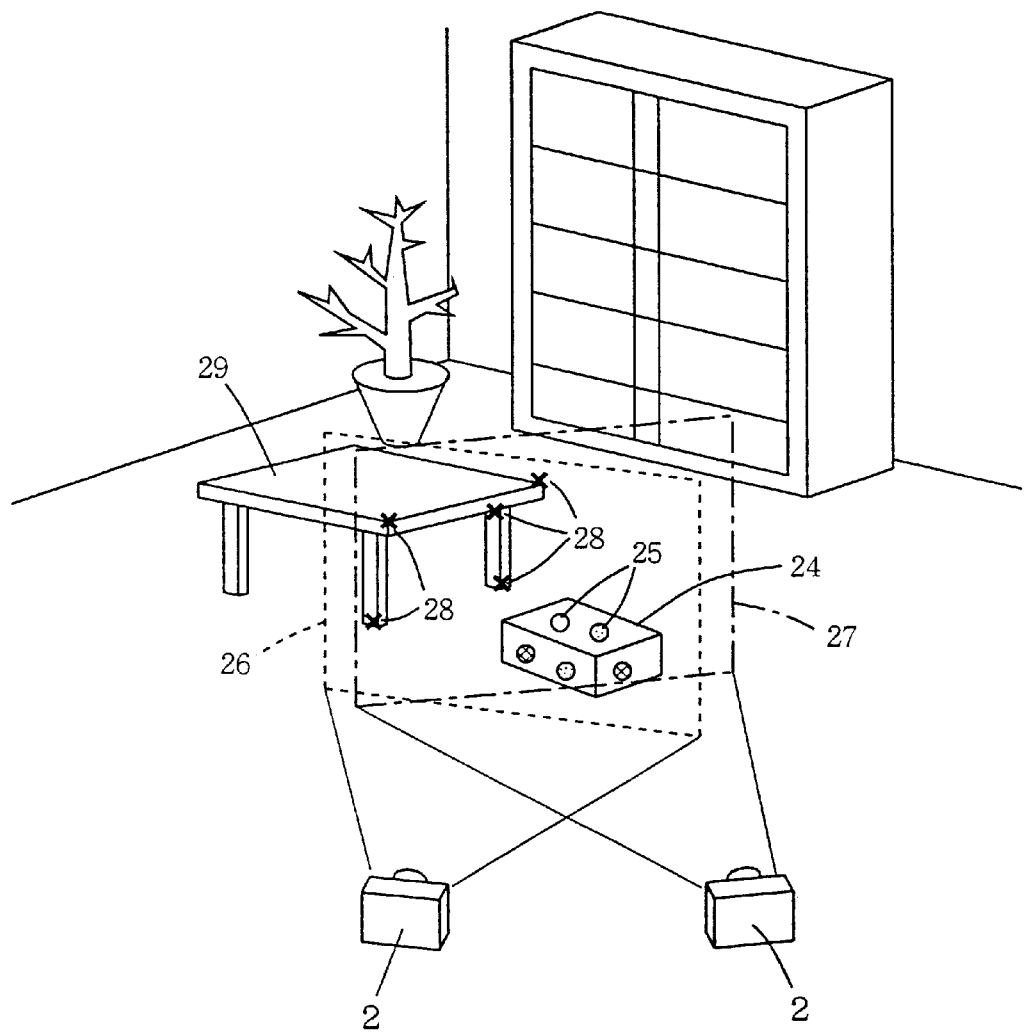
FIG. 21 is a perspective view for describing the first shooting of an object of interest according to the flow chart of FIG. 20.
Figure 22:
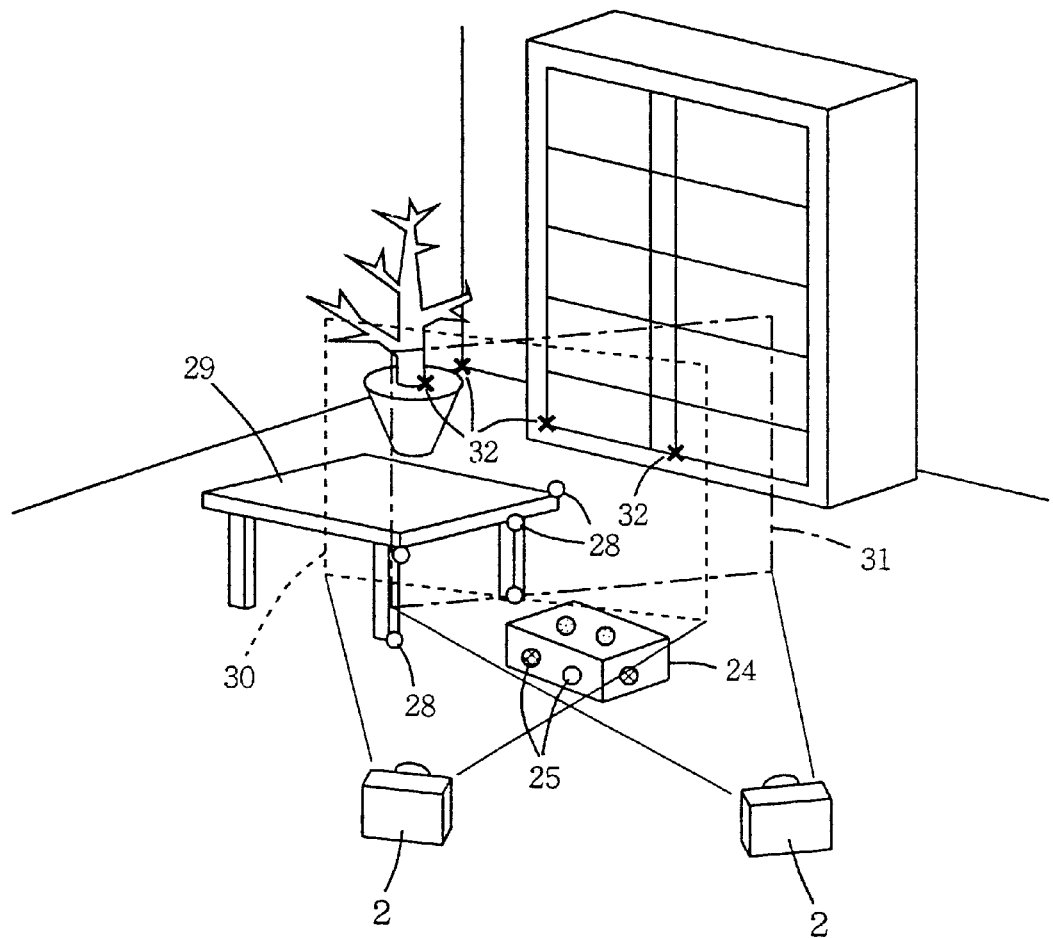
FIG. 22 is a perspective view for describing the second shooting succeeding the first shooting of FIG. 21.
Figure 23:
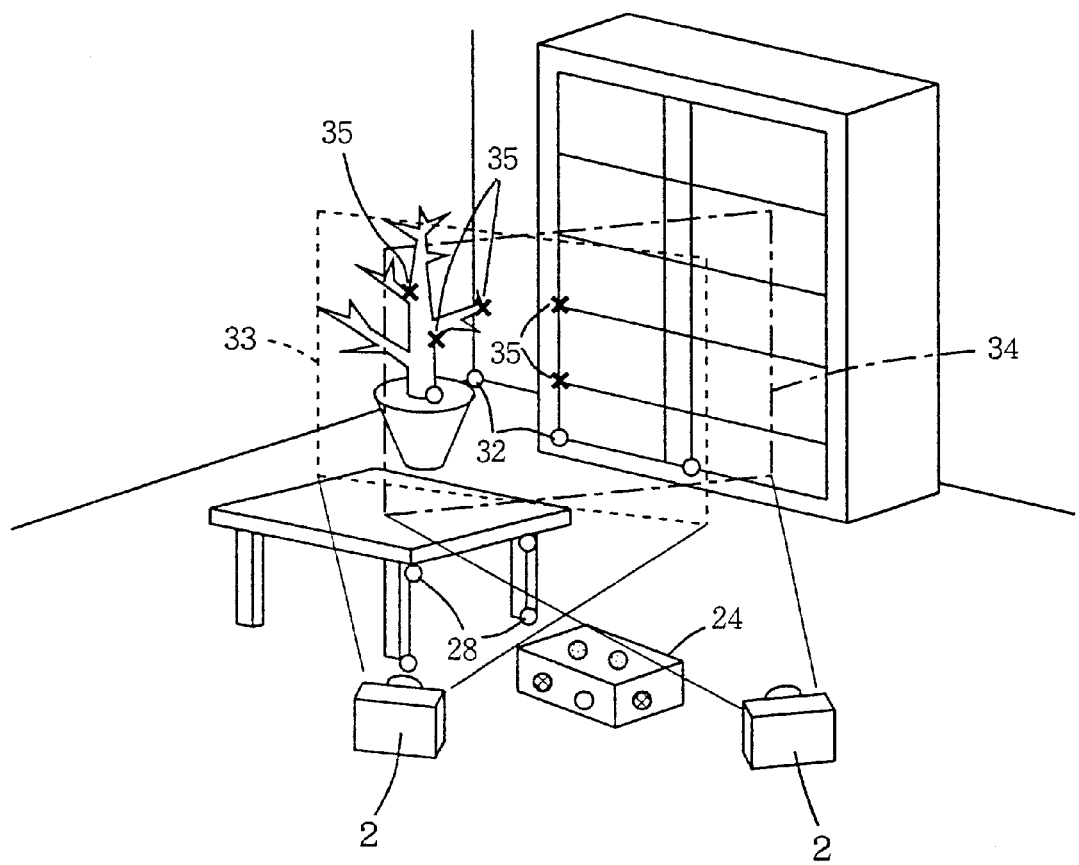
FIG. 23 is a perspective view for describing the third shooting succeeding the second shooting of FIG. 22.

The three-dimensional modeling apparatus is directed to generate a three-dimensional model of a huge object of interest such as a room as shown in FIGS. 21–23. In contrast to the previous first embodiment in which the reference points are fixed, the reference points in the second embodiment are sequentially updated.

More specifically, the program of the second embodiment includes, in addition to the steps shown in FIG. 11, a step S41 for extracting a candidate of a new reference point from a shot object image, a step S42 for calculating the three-dimensional coordinates of the new reference point candidate, a step S43 of registering that new reference point candidate as a reference point into RAM 9, i.e. replacing the candidate of that reference point with a prior reference point, and a step S44 for determining whether the object of interest has been shot from all the required points of view to generate a three-dimensional model sufficient from the processes of steps S2–S43.

The method of generating a three-dimensional model of an object of interest according to the three-dimensional modeling apparatus of the present embodiment will be described hereinafter.

Referring to FIG. 21, a reference object 24 is placed at an appropriate position in a room from which a three-dimensional model is to be generated.

Reference points 25 on reference object 24 are arranged irregularly and asymmetrically at predetermined positions. The position is registered in advance into RAM 9 at step S40 of FIG. 20, likewise step S1 of FIG. 11.

At step S2, a portion of the room is shot together with reference points 25 by camera 2. By shooting a portion of the room so as to include reference points 25 from different points of view for a plurality of times, a plurality of object images 26 and 27 are obtained.

At step S31, reference point 25 is extracted from the taken object images 26 and 27.

At steps S32–39, the position and angle of rotation of camera 2 are calculated according to the Hough transform method on the basis of the position and the color attribute of the reference point.

At step S41, a new reference point 28 is extracted as the candidate of the next reference point from the taken object images 26 and 27. It is desired that a characteristic point such as the corner of a desk 29 is extracted as the candidate of the new reference point. If the reference point corresponds to a corner of desk 29, the reference point can be extracted by edge detection.

At step S42, the three-dimensional coordinates of reference point 28 that is set as the candidate of the next reference point are calculated according to the principle of triangulation.

At step S43, the position of this new reference point 28 is registered to replace the position of the initial reference point 25. Thus, the position of the reference point is updated.

At step S44, determination is made whether all the object images required to generate a three-dimensional model of the room has been obtained or not. Since the object images are not yet sufficient at this current stage, control returns to step S2 to shoot another portion of the room including that new reference point 28 as shown in FIG. 22. Thus, object images 30 and 31 of another portion of the room including the new reference point 28 are obtained.

At step S31, reference point 28 is extracted from object images 30 and 31. At step S32–S39, the position and rotation of angle of camera 2 are calculated.

At step S41, a further new reference point 32 is extracted as the candidate of the next reference point from object images 30 and 31. At step S42, the three-dimensional coordinates of that new reference point are calculated. That reference point 32 is registered as a substitute for the previous reference point 28.

According to steps S2–S43 again, another different portion of the room is shot including new reference point 32. Object images 32 and 34 are obtained, and another new reference point 35 is registered.

At the final step of S44, the present program ends if determination is made that all the object images required to generate a three-dimensional model of the room are obtained.

According to the second embodiment of the present invention, a new reference point is set at a position excluding the position of the reference point of the shot object image at steps S41–S43. A three-dimensional model of even a huge object of interest such as a room can be generated. It is therefore not necessary to prepare a plurality of reference objects or a huge reference object even in the case of generating a three-dimensional model of a huge object of interest.

The present invention is not limited to the above-described method of generating a three-dimensional model of a huge object of interest by substituting the candidate of a reference point for the previous reference point. A method of adding the candidate of a reference point to the previous reference point can be employed instead of replacing the previous reference point. Therefore, data associated with a reference subject in an object image can be erased and data associated with another reference point can be registered. Also, data associated with another reference point can be registered in addition to existing data associated with a reference subject in an object image.

Third Embodiment

Figure 24:
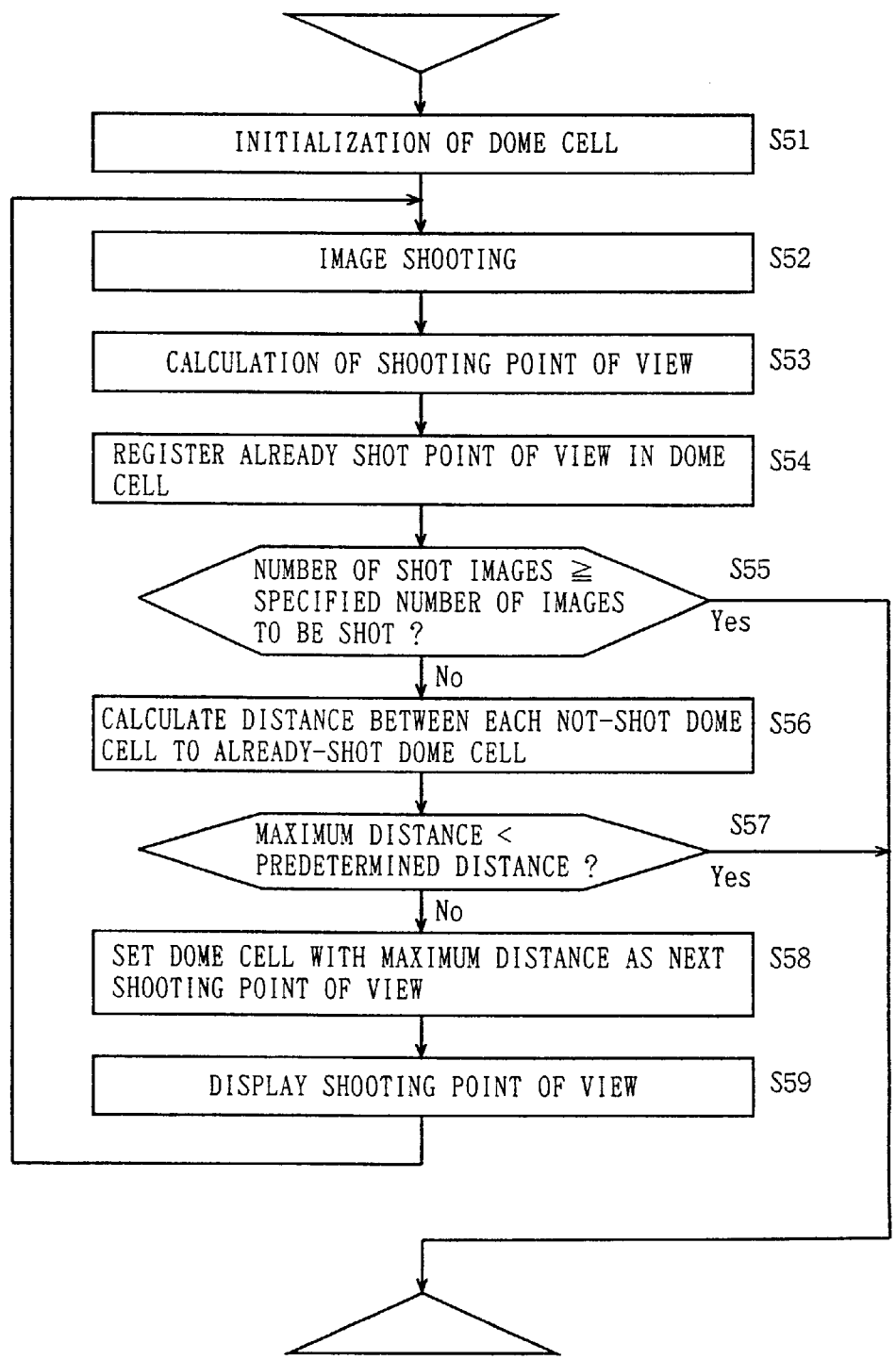
FIG. 24 is a flow chart showing main elements of a three-dimensional modeling apparatus according to a third embodiment of the present invention.

FIG. 24 is a flow chart showing main elements of a three-dimensional modeling apparatus according to a third embodiment of the present invention. In the previous embodiments, the point of view from which an object 12 is to be shot was selected arbitrarily by the operator of the camera. There is a possibility that the point of view for shooting is not taken evenly so that an object image sufficient for generating a complete three-dimensional model cannot be obtained. The third embodiment is directed to provide a three-dimensional modeling apparatus that allows an object image to be obtained reliably required to generate a complete three-dimensional model.

Referring to the flow chart of FIG. 24, steps S51 and S53–S59 correspond to a program executed by computer 3 to notify the next shooting point of view to the operator. The program is registered in CD-ROM 4.

Figure 25:
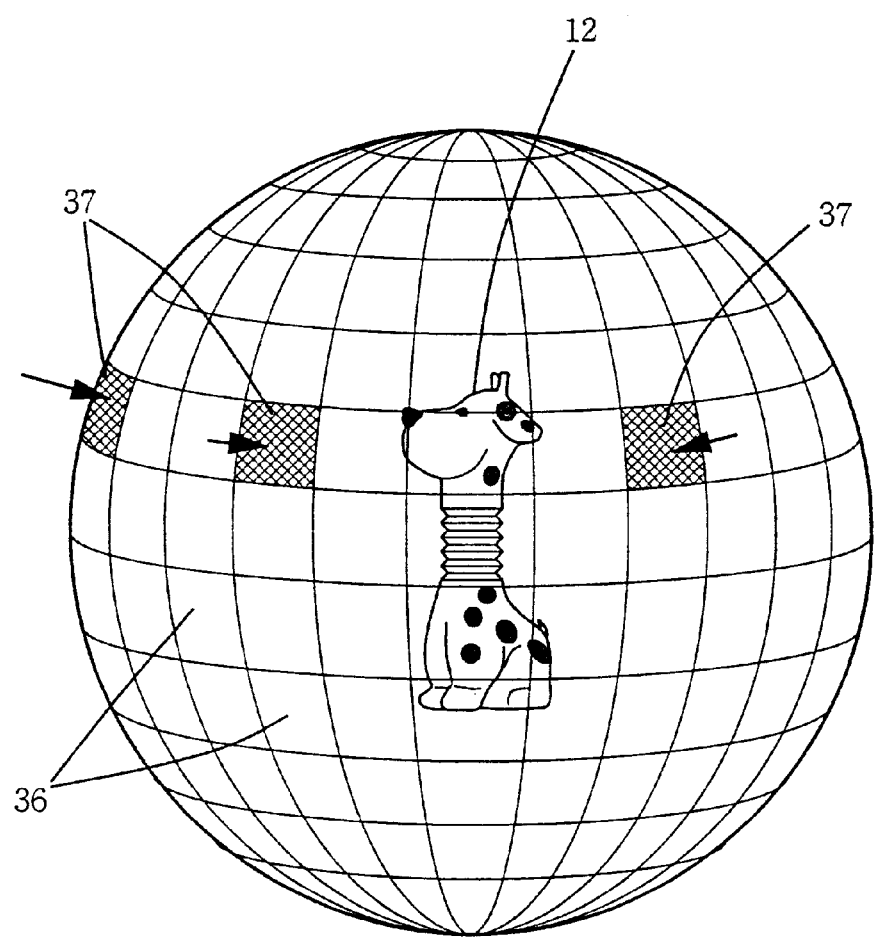
FIG. 25 is a schematic diagram of a dome formed of a plurality of cells envisaged according to the flow chart of FIG. 24.

Consider a spherical dome 38 formed of a plurality of cells 36 and 37 as shown in FIG. 25. The object of interest 12 is surrounded by dome 38. Cells 37 and 38 are storage regions provided within RAM 9 corresponding to the shooting point of view to capture the image of object 12. A storage region corresponding to a point of view from which a shot is already taken is registered accordingly. A predetermined address of RAM 9 is allotted to each of cells 36 and 37. According to the present third embodiment, the next point of view for shooting is instructed to the operator so that a cell 37 corresponding to an already shot state is scattered uniformly.

Although a spherical dome is envisaged here, a dome of a partial sphere, for example a hemispherical dome, can be envisaged when it is apparent that a point of view for shooting cannot be set at a lower level as in the case where an object of interest is placed on a flat ground.

Although notification of the next point of view for shooting is provided to the operator so that the shooting points of view are dispersed equally, notification can also be provided by calculating the next point of view for shooting from which a more accurate shape can be obtained according to the currently obtained schematic shape of the object of interest.

Referring to FIG. 24, this program includes a step S51 for initializing all cells of dome 38 to a not-yet-shot state, a step S53 for calculating a point of view for shooting, i.e., the position and angle of rotation of camera 2, according to the object image obtained at step S52 similar to steps S31–S39 of FIG. 11, a step S53 for setting a cell 37 corresponding to that shooting point of view to an already-shot state, a step S55 for comparing the number of shot object images with the desired number of object images, a step S56 for calculating the distance from each cell 36 of a not-shot state to a cell 37 of an already-shot state when the number of shot object images does not yet satisfy the desired number of object images, a step S57 for comparing the maximum one of the distances calculated at step S56 with a predetermined distance, a step S58 for setting the position of a cell 36 of a not-shot state having the maximum distance to cell 37 of an already-shot state as the next shooting point of view when the maximum distance calculated at step S56 is longer than the compared predetermined distance, and a step S59 for displaying the next shooting point of view set at step S58 within the finder of digital still camera 2. The position of an already shot state is stored in RAM 9.

The method of generating a three-dimensional model of an object of interest 12 according to the three-dimensional modeling apparatus of the present embodiment will be described hereinafter. Here, it is assumed that the specified number of object images is 20.

At step S51, all the cells in dome 38 are initialized to a not-shot state.

At step S52, object 12 is shot from a desired point of view to obtain an object image.

At step S53, the position of camera 2, i.e. the shooting point of view, is calculated according to the reference point and the like in the obtained object image.

At step S54, cell 37 corresponding to that shooting point of view is set to an already-shot state.

At step S55, the number of shot object images is compared with the specified number (here, 20).

When the number of object images already taken does not yet arrive at the specified number, control proceeds to step S56 where the distance from each cell 36 of a not-shot state to cell 37 of an already-shot state is calculated.

At step S57, the maximum distance of the calculated distance is compared with a predetermined distance. When the maximum distance is shorter than the predetermined distance, the program ends even if the number of object images already shot has not yet arrived at the specified number. This means that when a three-dimensional model can be generated sufficiently with, for example the taken 16 images, which is fewer than the specified number of 20, the program is terminated so that unnecessary images do not have to be taken.

When the calculated maximum distance is longer than the predetermined distance, control proceeds to step S58 where a cell 36 of a not-shot state having the maximum distance to cell 37 of an already-shot state is set as the next shooting point of view.

At step S59, that shooting point of view is displayed in the finder and the like of camera 2. In addition to the display of the next shooting point of view in the finder, the next point of view can be notified to the operator by computer 3 through audio. Thus, the operator shoots object 12 from the identified next shooting point of view at step S52.

Three-dimensional model 15 of object 12 is generated according to steps S4–S7 shown in FIG. 8 on the basis of the plurality of object images and shooting positions (shooting point of view) obtained as described above.

According to the third embodiment of the present invention, the shooting point of view is notified to the operator in order to obtain an object image required to generate a three-dimensional model 15. The shooting point of view will not be localized, so that the object images required to generated three-dimensional model 15 can be obtained efficiently. Furthermore, unnecessary shooting will not be carried out since the program ends appropriately. Thus, three-dimensional model 15 can be generated promptly.

In this embodiment, camera position is calculated based on an image where reference subjects are arranged. However camera position may be obtained with an inertia-based position detector.

Fourth Embodiment

In the above first embodiment, as the possibility of position candidates x, y, and z and candidates of angle of rotation α, β, and γ of camera 2 obtained at step S36 of FIG. 11 being correct, one point is applied indiscriminately to a relevant section in the Hough table shown in FIG. 13. However, the possibility that the obtained position candidates x, y, z and angle of rotation candidates α, β, and γ being correct is not identical for all the candidates. Some candidates have a high probability and some candidates have a low probability. Therefore, a point of a vote with weight according to this probability is given.

Figure 26:
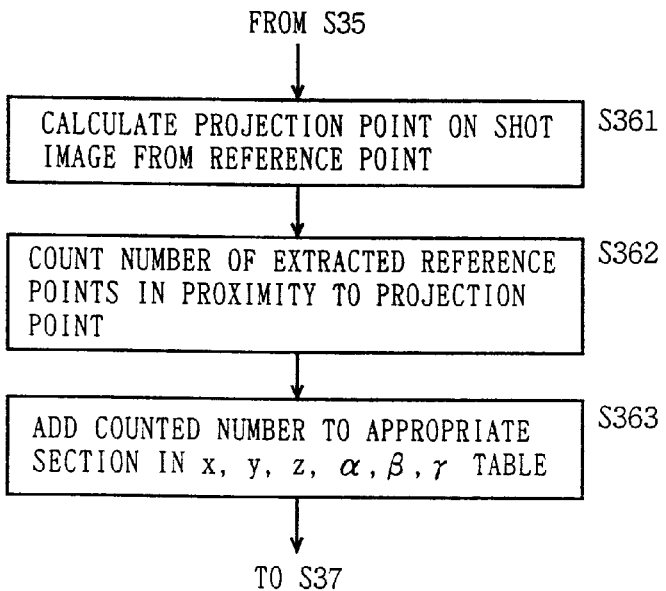
FIG. 26 is a flow chart showing main components of a three-dimensional modeling apparatus according to a fourth embodiment of the present invention.
Figure 27:
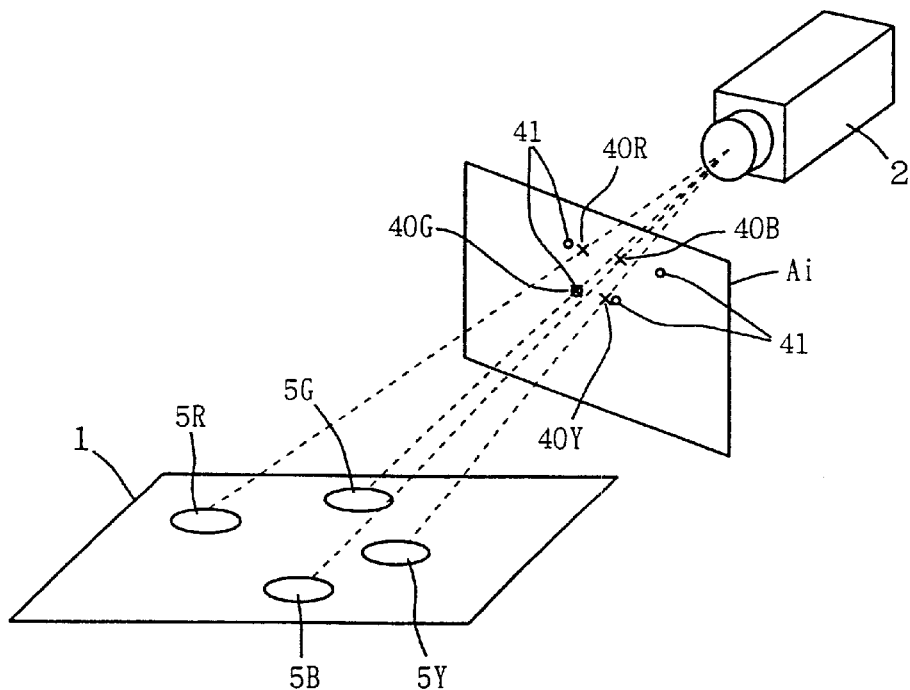
FIG. 27 is a perspective view for describing a projection point calculated in the flow chart of a FIG. 26.

More specifically, in the fourth embodiment of the present invention, steps S361–S363 shown in FIG. 26 are employed instead of step S36 of FIG. 11. Following step S35 shown in FIG. 11 where position candidates x, y, and z and angle of rotation candidates α, β, and γ of camera 2 are calculated, the program proceeds to step S361 of FIG. 26 where the position of projection points from all the reference points 5R, 5G, 5B an 5Y on reference sheet 1 onto each of object images A1–An are calculated according to position candidates x, y and z and angle of rotation candidates α, β, and γ. For example, as shown in FIG. 27, projection point 40R from reference point 5R is located at a point where the straight line from reference point 5R to camera 2 crosses a shot image Ai (i=1~n). Projection point 40G from reference point 5G is located at a point where the straight line from reference point 5G to camera 2 crosses shot image Ai.

Projection point 40B of reference point 5B is located at a point where the straight line from reference point 5B towards camera 2 crosses shot image Ai. Projection point 40Y of reference point 5Y is located at a point where the straight line from reference point 5Y to camera 2 crosses shot image Ai. These projection points correspond to the position of the reference points on shot image Ai that would have been obtained when camera 2 shoots reference points 5R, 5G, 5B and 5Y at the obtained position candidates x, y, z and angle of rotation candidates α, β, and γ. Reference point 41 extracted at step S31 of FIG. 11 is present on the actual shot image Ai. There is a reference point 41 that completely matches projection point 40G. There is also a reference point 41 that approximately matches projection points 40R and 40Y. However, there is no reference point that completely or approximately matches projection point 40B.

Figure 28:
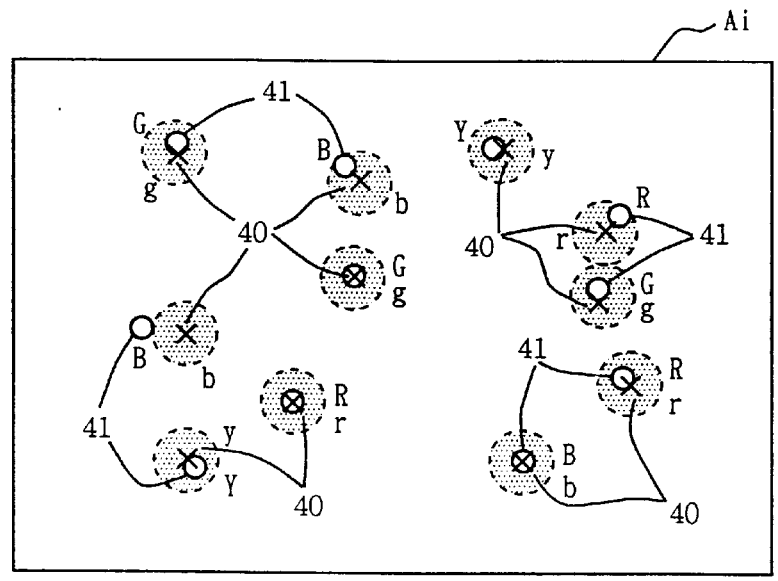
FIG. 28 is a front view showing an example of an object image including projection points calculated in the flow chart of FIG. 26 and the extracted reference points.

On shot image Ai shown in FIG. 28, for example, three projection points 40 completely match the extracted reference points 41. Although the other projection points 40 do not completely match the extracted reference point 41, there are extracted reference points 41 in the proximity (indicated by broken line) of seven projection points 40. There is no extracted reference point in the vicinity of the remaining one projection point 40.

Figure 29:
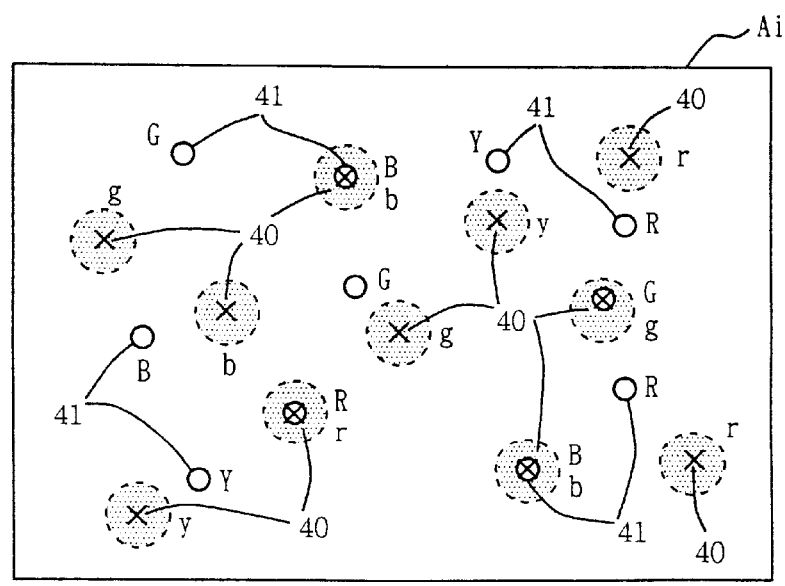
FIG. 29 is a front view showing another example of an object image including projection points calculated in the flow chart of FIG. 26 and extracted reference points.

On shot image Ai of FIG. 29, four projection points 40 completely match extracted reference points 41. The remaining reference points 40 do not completely match extracted reference point 41, and there is not reference point in the vicinity thereof.

In FIGS. 28 and 29, labels r, g, b and y in the proximity of a projection point 40 represent the color (red, green, blue and yellow) of a reference point on reference sheet 1 corresponding to a projection point. Labels R, G, B, and Y in the proximity of extracted reference points 41 represent the color (red, green, blue, and yellow) of an extracted reference point.

At step S362 of FIG. 26, the number of reference points 41 corresponding to or in the proximity of a projection point 40 are counted. More specifically, the number of reference points 41 out of extracted reference points 41 that are located within a predetermined distance from projection point 40 is counted. In the case of shot image Ai shown in FIG. 28, the count value is 10. For shot image Ai of FIG. 29, the count value is 4. A higher count value indicates the higher probability of the obtained position candidates x, y, z and angle of rotation candidates α, β, and γ being correct. A lower count value implies that the probability of being correct is low. It is to be noted that since the positions of actual reference points are allocated to the three reference points selected at step S33 of FIG. 11, at least three projection points 40 completely match extracted reference point 41.

At step S363, this count value is added to an appropriate section in the Hough table of FIG. 13. Thus, weighting is effected where candidates x, y, z, α, β, and γ having a higher probability of being correct is applied with a higher point. Here, the count number is applied directly as the point. However, a point according to the counted number (for example, a point in proportion to the count value) can be applied.

According to the fourth embodiment of the present invention a higher point is applied to candidates, x, y, z, α, β, and γ having a higher probability of being correct. Therefore, the calculation precision of the shooting position of camera 2 is further improved.

Fifth Embodiment

In the previous steps S34–S37 of FIG. 11, the position of all reference points 5R, 5G, 5B and 5Y on reference sheet 1, i.e., all the three-dimensional coordinate candidates are allocated, and one point is added to the obtained position candidates x, y, and z and angle of rotation candidates α, β, and γ of camera 2. However, there is a case where the reference point allocated at step S34 cannot be shot from the position obtained at step S35 when a reference object 20 or 22 that has a stereoscopic structure as shown in FIGS. 16 to 19 is employed. In this case, the position of the allocated reference point is definitely wrong. This case is treated as an error case. Points should not be applied to the obtained position candidates x, y, z and angle of rotation candidates α, β, γ. It is desirable to judge whether the obtained position candidates x, y, z and angle of rotation candidates α, β, γ can be shot or not and add a point to a relevant section in the Hough table only when an image of that reference point can be picked up.

Figure 30:
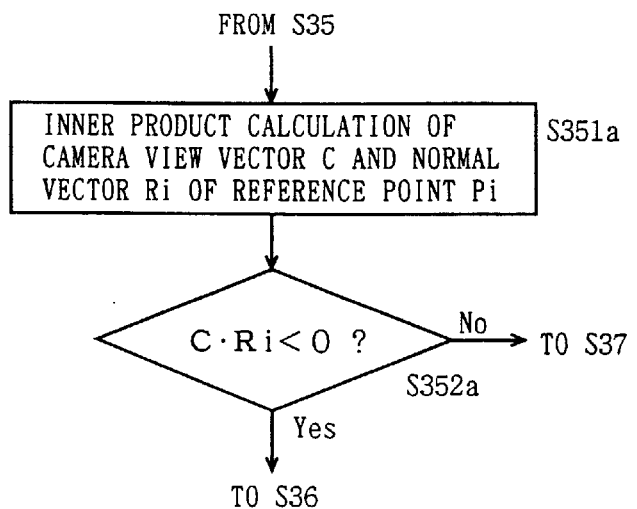
FIG. 30 is a flow chart showing main components of a three-dimensional modeling apparatus according to a fifth embodiment of the present invention.
Figure 31:
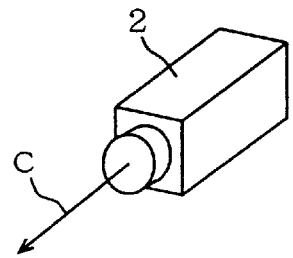
FIG. 31 is a perspective view for describing a camera view vector and a normal vector of a reference point used in the flow chart of FIG. 20.
Figure 31:
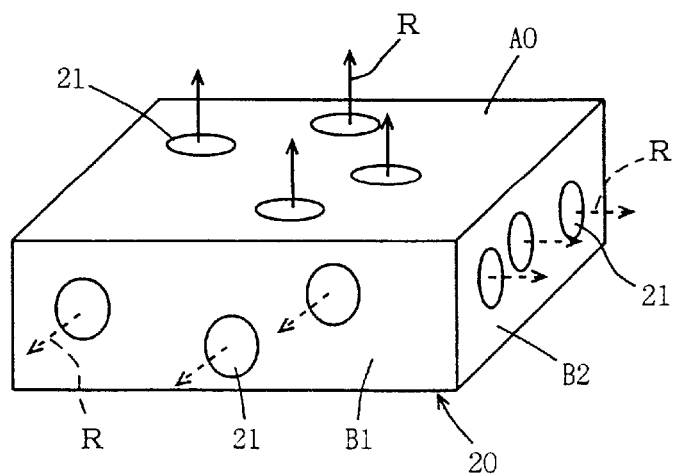

In the fifth embodiment of the present invention, steps S351*a* and S352*a* of FIG. 30 are inserted between step S35 and step S36 of FIG. 11. After position candidates x, y, z and angle of rotation candidates α, β, γ, of camera 2 are calculated at step S35 of FIG. 11, the process proceeds to step S351*a* of FIG. 30 where an inner product C·Ri is calculated. C is the view vector indicating the shooting direction of camera 2 and Ri is the normal vector of an allocated reference point Pi. As shown in FIG. 31, normal vector R is applied as an attribute to each reference point 21 formed at reference object 20. Normal vector R of reference point 21 formed on plane A0 is orthogonal to plane A0. Normal vector R of reference point 21 formed on plane B1 is orthogonal to plane B1. Normal vector R of reference point 21 formed on plane B2 is orthogonal to plane B2. View vector C of camera 2 matches the y' axis direction of camera 2 of FIG. 12. Normal vector Ri of reference point Pi allocated at step S34 out of reference points 21 to which normal vector R is applied as an attribute is used for the calculation of the inner product at step S351a.

At step S352*a*, determination is made whether the inner product C Ri is negative or not. A negative inner product C·Ri implies that the allocated reference point Pi can be shot. A positive value of inner product C·Ri implies that the allocated reference point Pi cannot be shot. In FIG. 31, reference point 21 on plane A0 can be shot whereas reference point 21 on planes B1 and B2 cannot be shot. Therefore, when all the three reference points P1, P2 and P3 allocated at step S34 of FIG. 11 can be shot, the process proceeds to step S36. When any one of reference points P1, O2 and P3 cannot be shot, the process proceeds to step S37. Therefore, one point is added to a relevant section in the Hough table only when an allocated reference point Pi can be shot.

According to the fifth embodiment of the present invention, the inner product of a view vector C of camera 2 and a normal vector Ri of reference point Pi is calculated. A voting process is carried out only in the case where reference point Pi can be shot according to the calculation result. Positions x, y, z and angle of rotations α, β, γ of camera 2 calculated on the basis of a reference point Pi that cannot be shot are excluded from the candidates. As a result, the position calculation precision of camera 2 is further improved.

Although the process proceeds to step S36 when inner product C·Ri is negative, the process can proceed to steps S361–S363 of FIGS. 26 instead of step S36.

Sixth Embodiment

Figure 32:
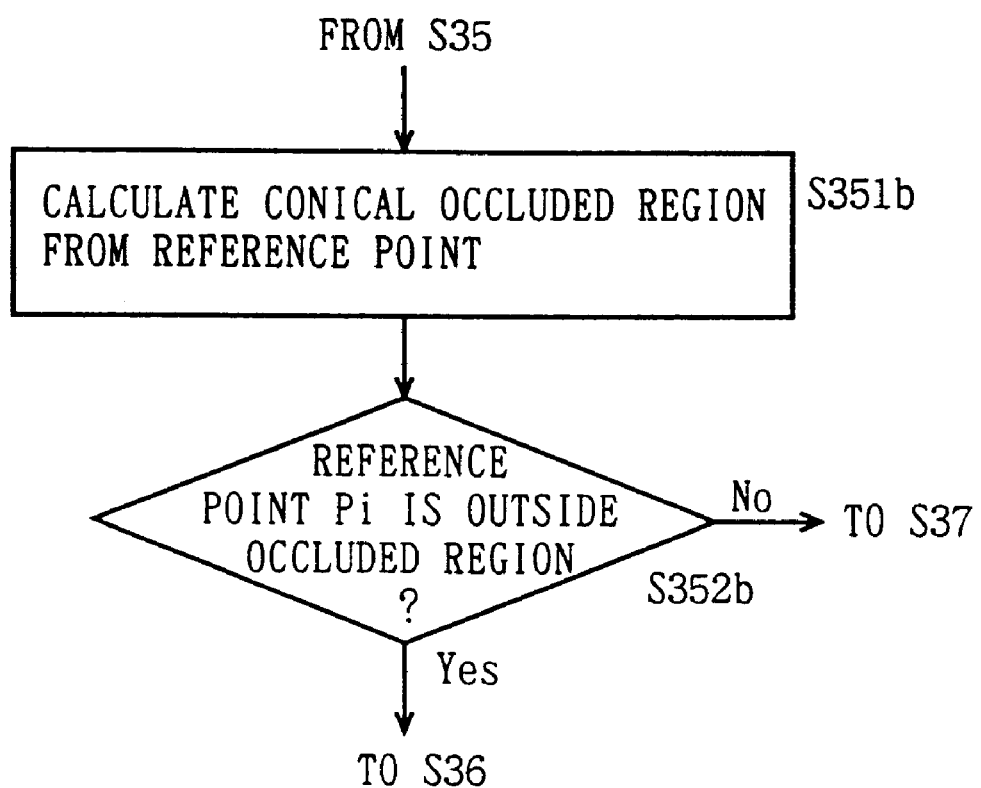
FIG. 32 is a flow chart showing the main components of a three-dimensional modeling apparatus according to a sixth embodiment of the present invention.
Figure 33:
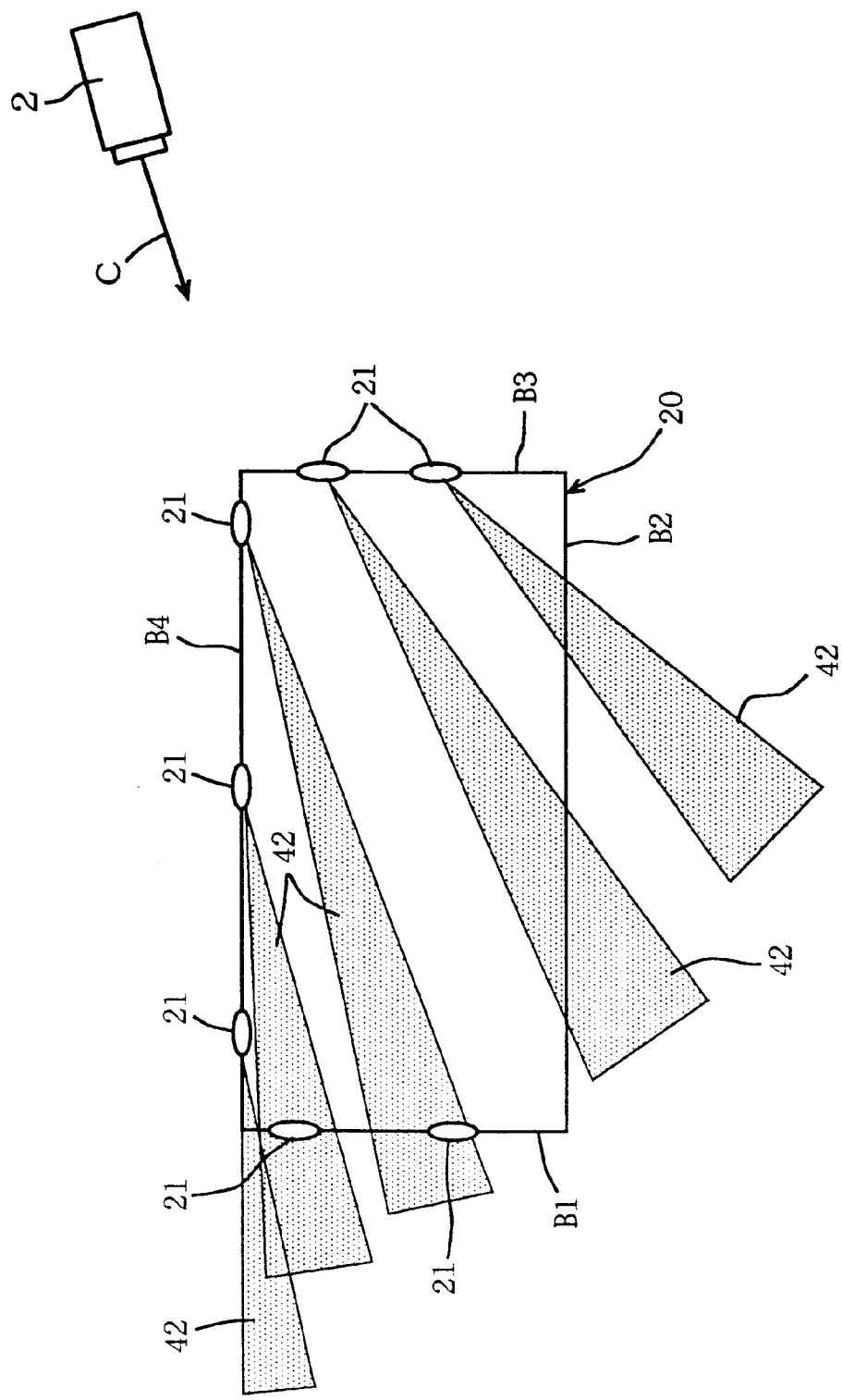
FIG. 33 is a plan view for describing an occluded region calculated in the flow chart of FIG. 32.

According to a sixth embodiment of the present invention, determination is made whether camera 2 can shoot the allocated reference point Pi at the obtained position candidates x, y, z and angle of rotation candidates α, β, γ, by a method different from the method of the fifth embodiment. Steps S351b and S352b of FIG. 32 are inserted between step S35 and step S36 of FIG. 11, as in the fifth embodiment. Following the calculation of position candidates x, y, z and angle of rotation candidates α, β, γ of camera 2 at step S35 of FIG. 11, the process proceeds to step S351b of FIG. 32 to calculate a conical occluded region extending from a reference point Pi allocated at step S34 according to obtained candidates x, y, z, α, β, and γ. As shown in FIG. 33, the conical occluded region 42 calculated here has reference point 21 as a vertex and extends in a direction farther away from camera 2.

At step S352b, determination is made whether allocated reference point Pi is outside occluded region 42. When reference point Pi is outside occluded region 42, it is appreciated that this reference point Pi can be shot at position x, y, z and angle of rotation α, β, γ obtained at step S35. When reference point Pi is inside occluded region 42, it is appreciated that this reference point Pi cannot be shot. Therefore, the process proceeds to step S36 when all the three allocated reference points Pi are outside occluded region 42. When any of reference points Pi is within occluded region 42, the process proceeds to step S37. Therefore, one point is added to a relevant section in the Hough table only when reference point Pi is outside occluded region 42.

In FIG. 33, reference point 21 on plane B1 is within occluded region 42 by reference point 21 on plane B4. Therefore, when the three-dimensional coordinate of reference point 21 on plane B1 is allocated to selected reference point Pi at step S33, that allocatement is an error. Therefore, position candidates x, y, z and angle of rotation candidates α, β, γ of camera 2 are excluded from the voting process of step S36.

According to the sixth embodiment of the present invention, the voting process of step S36 is carried out only when reference point 21 allocated at step S34 resides outside conical occluded region 42 extending from reference point 21 and set according to view vector C of camera 2. Therefore, the position calculation position of camera 2 is further improved.

Although the process proceeds to step S36 when reference point Pi is outside occluded region 42, the process can proceed to steps S361–S363 of FIG. 26 instead of step S36.

Seventh Embodiment

At step S39 of FIG. 11, the shooting position and posture of camera 2 is obtained by parameters x, y, z, α, β and γ. Parameters x, y, z, α, β and γ of higher calculation precision can be obtained by the least squares method with parameters x, y, z, α, β and γ as initial values. In this case, iteration calculation is effected so that the distance (error) between the calculated projection point 40 and the reference point 41 actually extracted from the shot image becomes smaller. For this purpose, correspondence between projection point 40 and extracted reference point 41 is required. When a reference object having a stereoscopic structure is employed, a reference point that can be shot at the position and the posture of camera 2 obtained at step S39 is discriminated in advance from a reference point that cannot be shot. Preferably, correspondence is established only between a reference point that can be shot and a reference point extracted actually from a shot image.

Figure 34:
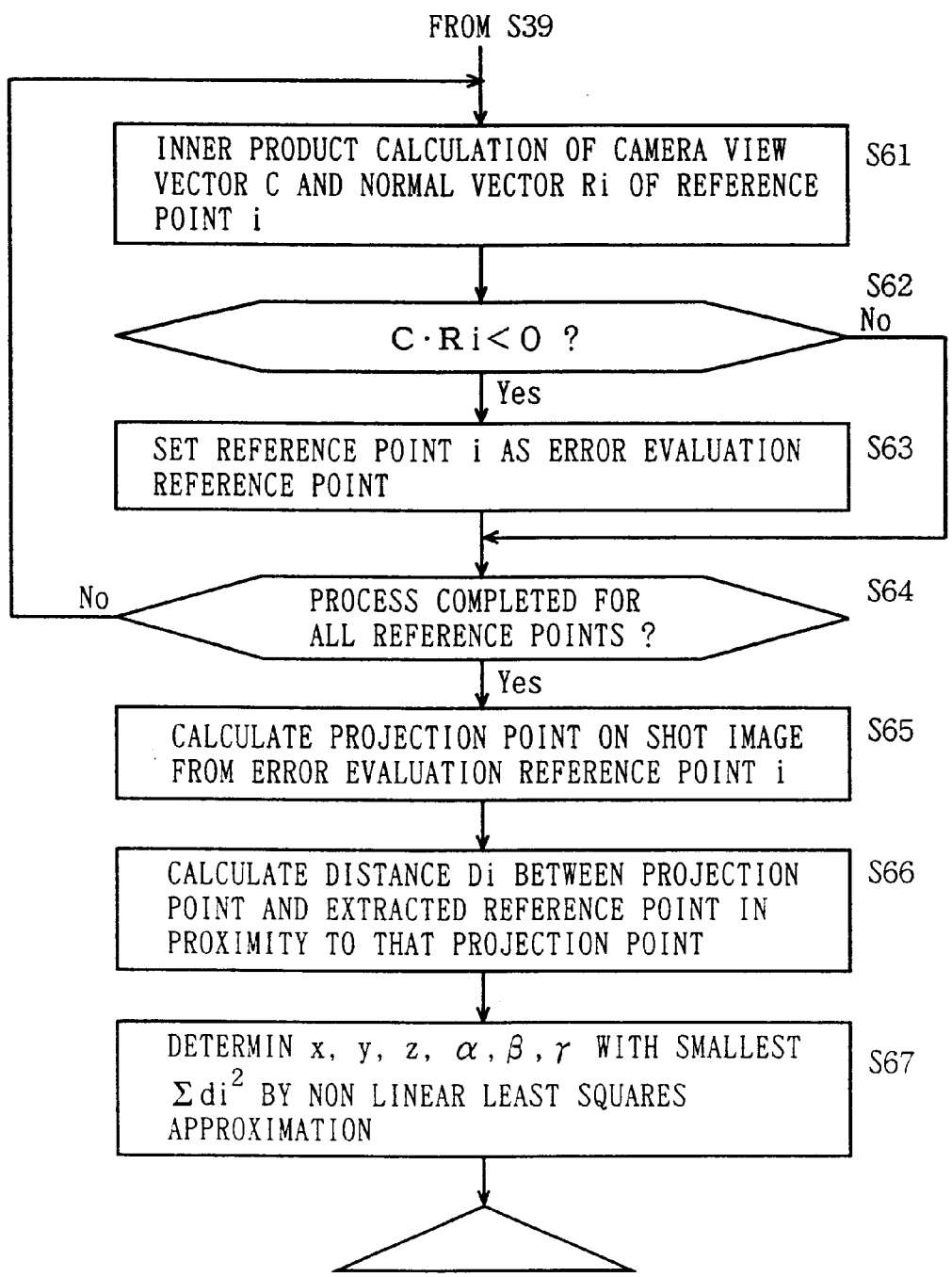
FIG. 34 is a flow chart showing main components of a three-dimensional modeling apparatus according to a seventh embodiment of the present invention.

More specifically, the process of steps S61–S67 of FIG. 34 is carried out subsequent to step S39 of FIG. 11. Steps S61–S67 is a program for generating a three-dimensional model of an object by a computer, and is stored in CD-ROM.

Figure 35:
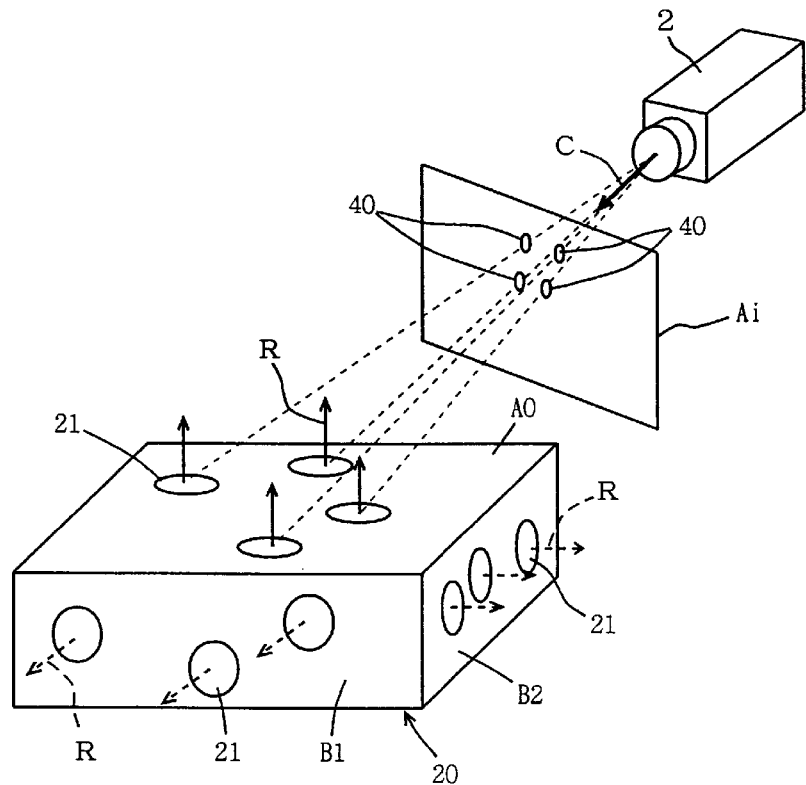
FIG. 35 is a perspective view for describing a camera view vector, a normal vector of a reference point, and a projection point used in the flow chart of FIG. 34.

Referring to FIG. 34, at steps S61–S64, a reference point that can be shot at the position and posture of camera 2 obtained at step S91 is judged. A reference point that can be shot is used for the error evaluation process of steps S65–S67. A reference point that cannot be shot is excluded from the process of the error evaluation. For example, in FIG. 35, reference point 21 on plane A0 of reference object 20 can be shot. However, reference points 21 on planes B1 and B2 cannot be shot. Therefore, only reference point 21 on plane A0 is used in the process of error evaluation. More specifically, at step S61, an inner product C·Ri of a view vector C of camera 2 and a normal vector Ri of one reference point i on reference object 20 is calculated.

At step S62, a negative inner product C·Ri implies that reference point i can be shot. Therefore, this reference point is used in the error evaluation of step S63. When the value of inner product C·Ri is positive, reference point i cannot be used for error evaluation since an image thereof cannot be taken. At step S64, this discrimination process is carried out for all the reference points. Then, the process proceeds to step S65.

At step S65, the position of each projection point 40 on shot image Ai from reference point 21 on reference object 21 is calculated according to parameters x, y, z, α, β and γ representing the position and posture of camera 2 obtained at step S39. Here, a projection point 40 corresponding to reference point i that is used in the error evaluation calculation of steps S61–S64 is calculated. It is to be noted that the position of a projection point on shot image Ai from all the reference points are calculated when all the reference points are used in the error evaluation calculation.

Figure 36:
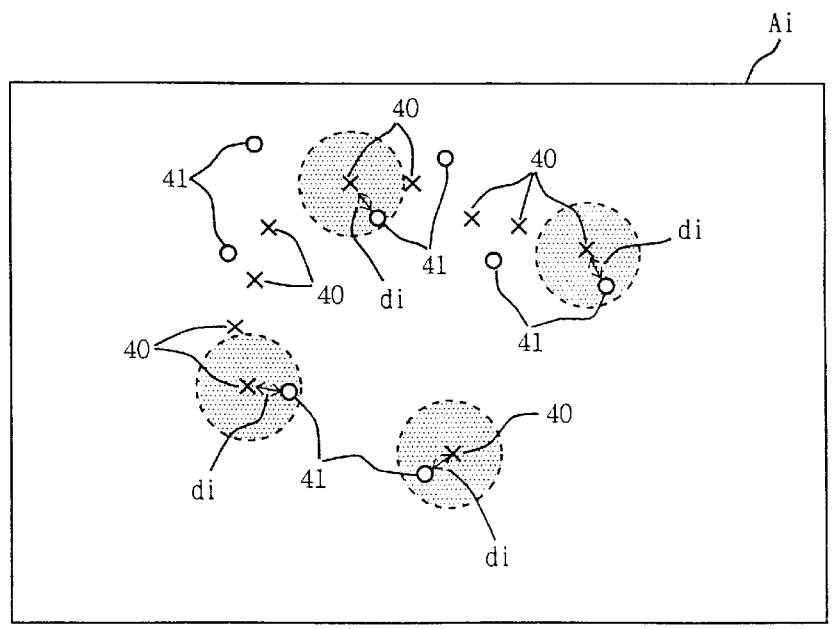
FIG. 36 is a front view showing an example of a shot image including projection points calculated of the flow chart of FIG. 34 and extracted reference points.

On shot image Ai of FIG. 36, projection points 40 corresponding to all reference points 21 and reference points 41 extracted at step S31 of FIG. 11 are shown. Only projection points 40 corresponding to reference point 21 that can be shot out of the plurality of projection points 40 has its neighborhood indicated by a broken line. Here, only four projection points 40 are used in the error evaluation that will be described afterwards.

At step S66, distance di between projection point 40 calculated at step S65 and a reference point out of extracted reference points 41 located in the proximity of that projection point 40 is calculated.

At step S67, parameters x, y, z, α, β and γ determined at step S39 are modified so that the sum of distance di is minimized by a non linear least squares method. As this non linear least squares method, the well known Levenberg-Marquardt method can be employed. This method is described in detail, for example, in "Numerical Recipe in C" by W. H. Press et al, Kijitsu Hyoronsha, pp. 540–547.

According to the seventh embodiment of the present invention, the error between the calculated projection point 40 and actually extracted reference point 41 is minimized by the non linear least squares method. Therefore, the calculation precision of the eventually obtained parameters x, y, z, α, β and γ is improved. Furthermore, since a reference point on reference object 21 that cannot be shot is excluded from the error evaluation, the calculation precision is further improved.

Here, only a reference point that can be shot is used for error evaluation. When a reference sheet 1 on a plane as shown in FIG. 1 is employed, all reference points can be used for error evaluation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional modeling apparatus for generating a three-dimensional model of an object, comprising:
   a plurality of reference subjects arranged irregularly
   an image capture device shooting said object together with said plurality of reference subjects to obtain an object image,
   a shooting position calculator referring to the reference subjects in said object image to calculate a shooting position of said image capture device, and
   a generator generating said three-dimensional model according to said object image and said shooting position,
   wherein said reference subjects are formed on a reference object having a three-dimensional structure,
   wherein said shooting position calculator comprises
      an extractor extracting said shot reference subjects from said object image,
      a selector selecting a plurality of reference subjects from said extracted reference subject,
      an allocator establishing correspondence between each of selected reference subjects and any one of said arranged plurality of reference subjects to allocate a position of a corresponding reference subject as a position candidate,
      a candidate calculator calculating a plurality of shooting position candidates of said capture device according to each of said reference subject position candidates,
      a judge judging whether said image capture device can shoot said allocated reference subjects from each of said plurality of shooting position candidates,
      an evaluator applying an evaluation value to each of said plurality of shooting position candidates when said judge judges that said allocated reference subject can be shot; and
      a determinator determining a shooting position candidate having a greatest evaluation value out of said calculated plurality of shooting position candidates as a shooting position of said image capture device.

2. The three-dimensional modeling apparatus according to claim 1, wherein said plurality of reference subjects are arranged irregularly and asymmetrically.

3. The three-dimensional modeling apparatus according to claim 1, wherein said plurality of reference subjects have a plurality of attributes.

4. The three-dimensional modeling apparatus according to claim 1, wherein said reference subjects are formed on a reference sheet.

5. The three-dimensional modeling apparatus according to claim 1, wherein said reference subjects are formed on a reference object having a three-dimensional structure.

6. The three-dimensional modeling apparatus according to claim 1, further comprising a setter newly setting another reference subjects at a position other than the position of reference subjects in said object image.

7. A three-dimensional modeling apparatus for generating a three-dimensional model of an object, comprising:
   a plurality of reference subjects arranged irregularly,
   an image capture device shooting said object together with said plurality of reference subjects to obtain an object image, a shooting position calculator referring to the reference subjects in said object image to calculate a shooting position of said image capture device, and a generator generating said three-dimensional model according to said object image and said shooting position, wherein said shooting position calculator comprises:
an extractor extracting said shot reference subjects from said object image,
a selector selecting a plurality of reference subjects from said extracted reference subjects,
an allocator establishing correspondence between each of said selected reference subjects and any one of said arranged plurality of reference subjects to allocate a position of a corresponding reference as a position candidate,
candidate calculator calculating a plurality of shooting position candidates of said image capture device according to each of said reference subject position candidates,
an evaluator applying an evaluation value to each of said plurality of shooting position candidates, and
a determiner determining a shooting position candidate having a greatest evaluation value out of said calculated plurality of shooting position candidates as a shooting position of said image capture device.

8. The three-dimensional modeling apparatus according to claim 7, wherein said evaluator comprises
a projection point calculator calculating respective position of a plurality of projection points on said object image from said arranged plurality of reference subjects according to said shooting position candidate,
a counter counting the number of reference subjects located within a predetermined distance from said projection point out of said extracted reference subjects, and
a weight applier applying an evaluation value according to said counted number of reference subjects to said shooting position candidate.

9. The three-dimensional modeling apparatus according to claim 7, wherein said shooting position calculator comprises
a projection point calculator calculating respective position of a plurality of projection points on said object image from said arranged plurality of reference subjects according to said determined shooting position,
a distance calculator calculating a distance between said projection point and a reference subject out of said extracted reference subjects that is located in proximity to said projection point, and
a modifier modifying said determined shooting position so that an evaluation value based on said distance becomes smaller.

10. A three-dimensional modeling method for generating a three-dimension model for an object, comprising the steps of:
arranging a plurality of reference subjects irregularly,
shooting said object together with said reference subjects with image capture device to obtain an object image,
calculating a shooting position of said image capture device by referring to reference subjects in said object image and
generating said three-dimensional model according to said object image and said shooting position,
wherein said reference subjects are formed on a reference object having a three-dimensional structure, wherein said step of calculating a shooting position comprises the steps of
extracting said shot reference subjects from said object image,
selecting a plurality of references subjects from said extracted reference subjects,
establishing correspondence between each of said selected reference subjects and any one of said arranged plurality of reference subjects to allocate a position of a corresponding reference subject as a position candidate,
calculating a plurality of shooting position candidates of said image capture device according to said each of reference subject position candidates,
judging whether said image capture device can shoot said allocated reference subjects from each of said plurality of shooting position candidates,
applying an evaluation value to each of said plurality of shooting position candidate when judgement is made that said allocated reference subjects can be shot, and
determining a shooting position candidate having a greatest evaluation value out of said calculated plurality of shooting position candidates as a shooting position of said image capture device.

11. The three-dimensional modeling method according to claim 10, wherein said reference subjects are formed on a reference object having a three-dimensional structure.

12. The three-dimensional modeling method according to claim 10, further comprising the step of newly setting another reference subject at a position other than the position of reference subjects in said object image.

13. The three-dimensional modeling method according to claim 10, further comprising the steps of
storing said shooting position, and
notifying an operator of said image capture device of a position other than said stored shooting position.

14. A medium on which a three-dimensional modeling program is recorded to have a computer generate a three-dimensional model of an object according to an object image obtained by shooting with image capture device said object together with a plurality of reference subjects arranged irregularly, said program comprising the steps of:
calculating a shooting position of said image capture device by referring to reference subjects in said object image, and
generating said three-dimensional model according to said object image and said shooting position,
wherein said reference subjects are formed on a reference object having a three-dimensional structure,
wherein said step of calculating a shooting position comprises the steps of
extracting said shot reference subjects from said object image,
selecting a plurality of reference subjects from said extracted reference subjects,
establishing correspondence between each of said selected reference subjects and any one of said arranged plurality of reference subjects to allocate a position of a corresponding reference subject as a position candidate,
calculating a plurality of shooting position candidates of said image capture device to each of said reference subject position candidates,
judging whether said image capture device can shoot said allocated reference subject from each of said plurality of shooting position candidates, applying an evaluation value to each of said plurality of shooting position candidates when judgement is made that said allocated reference subjects can be shot, and determining a shooting position candidate having a greatest evaluation value of said calculated plurality of shooting position candidates as a shooting position of said image capture device.

15. The medium according to claim 14, wherein said reference subjects are formed on a reference object having a three-dimensional structure.

16. The medium according to claim 14, wherein said program further comprises the step of newly setting another reference subject at a position other than the position of reference subjects in said object image.

17. The medium according to claim 14, wherein said program further comprises the steps of storing said shooting position in a memory of said computer, and notifying of an operator of said image capture device of a position other than said shooting position stored in said memory.

18. A three-dimensional modeling-apparatus for generating a three-dimensional model of an object comprising:

a plurality of reference subjects arranged irregularly, and asymmetrically on a surface, each reference subject having a position and an attribute, the arrangement determined so that the distribution of distances and angles between the reference subjects is uniform, and the distribution of attributes with respect to the angles and distances is uniform, an image capture device shooting said object together with said reference subjects to obtain an object image, a shooting position calculator referring to the reference subjects in said object image to calculate a shooting position of said image capture device, and a generator generating said three-dimensional model according to said object image and said shooting position, wherein the said each reference subject is non-identifiable itself.

19. The three-dimensional modeling apparatus according to claim 18:

further comprising a setter newly setting another reference subject to a position other than the position of reference subjects in said object image, wherein, the position of said another reference subject is unknown, and further comprising a positioner which determine the position of said another reference subject.

* * * * *